United States Patent
Wang et al.

(10) Patent No.: US 10,869,016 B2
(45) Date of Patent: Dec. 15, 2020

(54) METHODS AND APPARATUS FOR ENCODING AND DECODING VIRTUAL REALITY CONTENT

(71) Applicant: MEDIATEK Singapore Pte. Ltd., Singapore (SG)

(72) Inventors: Xin Wang, San Jose, CA (US); Lulin Chen, San Jose, CA (US)

(73) Assignee: MEDIATEK Singapore Pte. Ltd., Singapore (SG)

( * ) Notice: Subject to any disclaimer, the term of this patent is extended or adjusted under 35 U.S.C. 154(b) by 0 days.

(21) Appl. No.: 16/381,846

(22) Filed: Apr. 11, 2019

(65) Prior Publication Data

US 2019/0320155 A1    Oct. 17, 2019

Related U.S. Application Data

(60) Provisional application No. 62/656,577, filed on Apr. 12, 2018.

(51) Int. Cl.
*H04N 13/178* (2018.01)
*H04N 13/161* (2018.01)
*H04N 13/117* (2018.01)

(52) U.S. Cl.
CPC ........ *H04N 13/178* (2018.05); *H04N 13/117* (2018.05); *H04N 13/161* (2018.05)

(58) Field of Classification Search
CPC ... H04N 13/178; H04N 13/161; H04N 13/117
(Continued)

(56) References Cited

U.S. PATENT DOCUMENTS

2009/0055417 A1    2/2009  Hannuksela
2012/0023250 A1    1/2012  Chen et al.
(Continued)

FOREIGN PATENT DOCUMENTS

CN    101711483 A    5/2010
CN    101897193 A    11/2010
(Continued)

OTHER PUBLICATIONS

[No Author Listed], Information technology—Coded representation of immersive media (MPEG-I)—Part 2: Omnidirectional media format. ISO/IEC FDIS 23090-2:201x (E). Feb. 7, 2018:178 pages.
(Continued)

*Primary Examiner* — Tung T Vo
(74) *Attorney, Agent, or Firm* — Wolf, Greenfield & Sacks, P.C.

(57) ABSTRACT

The techniques described herein relate to methods, apparatus, and computer readable media configured to process multi-view multimedia data. The multi-view multimedia data includes a hierarchical track structure with at least a first track, wherein the first track is at a first level in the hierarchical track structure, and includes data for both a first view and a second view of the multi-view multimedia data. Metadata contained within the first track can be determined and used to perform an extraction operation on the first track to generate first media data of a second track, wherein the first media data is for the first view, and second media data of a third track, wherein the second media data is for the second view, wherein the second track and the third track are at a second level in the hierarchical track structure above the first level of the first track.

12 Claims, 13 Drawing Sheets

(58) Field of Classification Search
USPC .................................................. 375/240.13
See application file for complete search history.

(56) References Cited

U.S. PATENT DOCUMENTS

| | | | |
|---|---|---|---|
| 2012/0221741 A1* | 8/2012 | Frojdh ........... | H04N 21/234318 709/231 |
| 2017/0237965 A1 | 8/2017 | Wang et al. | |
| 2018/0063505 A1* | 3/2018 | Lee ..................... | H04N 13/178 |
| 2018/0213216 A1* | 7/2018 | Hwang ................... | H04N 7/01 |
| 2018/0332265 A1* | 11/2018 | Hwang ............... | H04N 13/178 |
| 2019/0141311 A1* | 5/2019 | Lee ..................... | H04N 21/816 |
| 2019/0222822 A1 | 7/2019 | Wang et al. | |
| 2019/0253734 A1* | 8/2019 | Lee ................... | H04N 5/23238 |
| 2019/0313081 A1* | 10/2019 | Oh ...................... | H04N 13/117 |

FOREIGN PATENT DOCUMENTS

| | | |
|---|---|---|
| CN | 102132562 A | 7/2011 |
| WO | WO 2017/140946 A1 | 8/2017 |

OTHER PUBLICATIONS

[No Author Listed], Information technology—Coded representation of immersive media (MPEG-I)—Part 2: Omnidirectional media format. ISO/IEC JTC1/SC29/WG11. Dec. 11, 2017:178 pages.

[No Author Listed], Information technology—Coding of audio-visual objects, Part 12: ISO base media file format. International Standard, ISO/IEC 14496-12, Fifth Edition. Feb. 20, 2015:250 pages.

Wang et al., Deriving Composite Tracks in ISOBMFF using Track Grouping Mechanisms. Organisation for Standardisation, Coding of Moving Pictures and Audio, ISO/IEC JTC1/SC29/WG11 MPEG2016/M40384. Apr. 2017:12 pages.

Wang et al., Deriving Composite Tracks in ISOBMFF. International Organisation for Standardisation, Coding of Moving Pictures and Audio, ISO/IEC JTC1/SC29/WG11 MPEG2016/M39971. Jan. 2017:9 pages.

Wang et al., Deriving VR Projection and Mapping related Tracks in ISOBMFF. International Organisation for Standardisation, Coding of Moving Pictures and Audio, ISO/IEC JTC1/SC29/WG11 MPEG2016/M40385. Apr. 2017:8 pages.

Wang et al., Deriving VR ROI and Viewport related Tracks in ISOBMFF. International Organisation for Standardisation, Coding of Moving Pictures and Audio, ISO/IEC JTC1/SC29/WG11 MPEG2016/M40412. Apr. 2017:11 pages.

Wang et al., OMAF: Track Derivation Hierarchy Approach to Association of Attributes and Metadata to Sub-Picture Composition Tracks. International Organisation for Standardisation, Coding of Moving Pictures and Audio, ISO/IEC JTC1/SC29/WG11 MPEG2017/m42120. Jan. 2018:4 pages.

Wang et al., WD 4 of ISO/IEC 23090-2 OMAF 2nd edition. International Organisation for Standardisation, Coding of Moving Pictures and Audio, ISO/IEC JTC1/SC29/WG11 N18227-v1. Jan. 2019:220 pages.

Hannuksela et al., Technology under Consideration on sub-picture composition track grouping for OMAF International Organisation for Standardisation, Coding of Moving Pictures and Audio, ISO/IEC JTC1/SC29/WG11 MPEG2017/N17279. Oct. 2017:6 pages.

\* cited by examiner

| Metadata Box | Number in Track Hierarchy | Number in Flat Grouping |
|---|---|---|
| ProjectedOmniVideoBox | 1 | L x M x N |
| RegionWisePackingBox | 1 | L x M x N |
| SubPictureCompositionBox | M x N | L x M x N |
| VariantPictureBox | L x M x N | L x M x N |

FIG. 11

METHODS AND APPARATUS FOR ENCODING AND DECODING VIRTUAL REALITY CONTENT

RELATED APPLICATIONS

This Application claims priority under 35 U.S.C. § 119(e) to U.S. Provisional Application Ser. No. 62/656,577, filed Apr. 12, 2018, entitled "METHODS OF HIERARCHICAL TRACK DERIVATION FOR OMAF MEDIA CONTENT IN ISOBMFF", which is hereby incorporated by reference in its entirety.

TECHNICAL FIELD

The techniques described herein relate generally to video coding, and particularly to associating, storing and/or signaling virtual reality (VR) attributes and/or metadata, and multimedia track derivation for stereoscopic media.

BACKGROUND OF INVENTION

Various types of 3D content and multi-directional content exist. For example, omnidirectional video is a type of video that is captured using a set of cameras, as opposed to just a single camera as done with traditional unidirectional video. For example, cameras can be placed around a particular center point, so that each camera captures a portion of video on a spherical coverage of the scene to capture 360-degree video. Video from multiple cameras can be stitched, possibly rotated, and projected to generate a projected two-dimensional picture representing the spherical content. For example, an equal rectangular projection can be used to put the spherical map into a two-dimensional image. This can be then further processed, for example, using two-dimensional encoding and compression techniques. Ultimately, the encoded and compressed content is stored and delivered using a desired delivery mechanism (e.g., thumb drive, digital video disk (DVD), file download, digital broadcast, and/or online streaming). Such video can be used for virtual reality (VR) and/or 3D video.

At the client side, when the client processes the content, a video decoder decodes the encoded and compressed video and performs a reverse-projection to put the content back onto the sphere. A user can then view the rendered content, such as using a head-mounted viewing device. The content is often rendered according to a user's viewport, which represents an angle at which the user is looking at the content. The viewport may also include a component that represents the viewing area, which can describe how large, and in what shape, the area is that is being viewed by the viewer at the particular angle.

When the video processing is not done in a viewport-dependent manner, such that the video encoder and/or decoder do not know what the user will actually view, then the whole encoding, delivery and decoding process will process the entire spherical content. This can allow, for example, the user to view the content at any particular viewport and/or area, since all of the spherical content is encoded, delivered and decoded.

However, processing all of the spherical content can be compute intensive and can consume significant bandwidth. For example, for online streaming applications, processing all of the spherical content can place a larger burden on network bandwidth than necessarily needed. Therefore, it can be difficult to preserve a user's experience when bandwidth resources and/or compute resources are limited. Some techniques only process the content being viewed by the user. For example, if the user is viewing a top area (e.g., the north pole), then there is no need to deliver the bottom part of the content (e.g., the south pole). If the user changes viewports, then the content can be delivered accordingly for the new viewport. As another example, for free viewpoint TV (FTV) applications (e.g., which capture video of a scene using a plurality of cameras), the content can be delivered depending at which angle the user is viewing the scene. For example, if the user is viewing the content from one viewport (e.g., camera and/or neighboring cameras), there is probably no need to deliver content for other viewports.

SUMMARY OF INVENTION

In accordance with the disclosed subject matter, apparatus, systems, and methods are provided for associating, storing and/or signaling virtual reality (VR) attributes and/or metadata, and track composition for multi-view media, such as stereoscopic media.

Some embodiments relate to a decoding method for decoding video data. The method includes receiving multi-view multimedia data comprising a hierarchical track structure comprising at least a first track, wherein the first track is at a first level in the hierarchical track structure, and includes data for both a first view and a second view of the multi-view multimedia data. The method includes determining metadata contained within the first track, and performing, based on the determined metadata, an extraction operation on the first track to generate first media data of a second track, wherein the first media data is for the first view and second media data of a third track, wherein the second media data is for the second view, wherein the second track and the third track are at a second level in the hierarchical track structure above the first level of the first track.

In some examples, determining the metadata comprises determining stereoscopic frame packing metadata, wherein the stereoscopic frame packing metadata comprises data indicative of one or more parameters used to generate the first media data, the second media data, or both.

In some examples, the first track comprises a projected two-dimensional track, the second track comprises a first projected video track for the first view, and the third track comprises a second projected video track for the second view.

In some examples, the method further includes performing a track derivation operation on multimedia content associated with the first track to generate media data of the first track. The first track can be associated with a plurality of variant tracks, each variant track including multi-view multimedia data, and performing the track derivation operation can include performing the track derivation operation on the plurality of variant tracks to generate the media data of the first track.

In some examples, receiving the multi-view multimedia data comprises receiving stereoscopic multimedia data, wherein the stereoscopic multimedia data comprises data for both a left view and a right view of the multi-view multimedia data.

Some embodiments relate to a method for encoding video data. The method includes encoding multi-view multimedia data comprising a hierarchical track structure comprising at least a first track, wherein the first track is at a first level in the hierarchical track structure, and includes data for both a first view and a second view of the multi-view multimedia data. The method can include encoding metadata within the first track, such that the metadata can be used to determine an extraction operation on the first track to generate first media data of a second track, wherein the first media data is for the first view, and second media data of a third track, wherein the second media data is for the second view, wherein the second track and the third track are at a second level in the hierarchical track structure above the first level of the first track.

In some examples, encoding the metadata includes encoding stereoscopic frame packing metadata comprising data indicative of one or more parameters used to generate the first media data, the second media data, or both.

In some examples, the first track comprises a projected two-dimensional track, the second track comprises a first projected video track for the first view, and the third track comprises a second projected video track for the second view.

In some examples, encoding the multi-view multimedia data comprises encoding stereoscopic multimedia data, wherein the stereoscopic multimedia data comprises data for both a left view and a right view of the multi-view multimedia data.

Some embodiments relate to an apparatus configured to decode video data. The apparatus includes a processor in communication with memory, the processor being configured to execute instructions stored in the memory that cause the processor to receive multi-view multimedia data comprising a hierarchical track structure comprising at least a first track, wherein the first track is at a first level in the hierarchical track structure, and includes data for both a first view and a second view of the multi-view multimedia data. The instructions are further configured to cause the processor to determine metadata contained within the first track, and perform, based on the determined metadata, an extraction operation on the first track to generate first media data of a second track, wherein the first media data is for the first view, and second media data of a third track, wherein the second media data is for the second view, wherein the second track and the third track are at a second level in the hierarchical track structure above the first level of the first track.

In some examples, determining the metadata comprises determining stereoscopic frame packing metadata, wherein the stereoscopic frame packing metadata comprises data indicative of one or more parameters used to generate the first media data, the second media data, or both.

In some examples, the first track comprises a projected two-dimensional track, the second track comprises a first projected video track for the first view, and the third track comprises a second projected video track for the second view.

In some examples, the instructions are further configured to cause the processor to perform a track derivation operation on multimedia content associated with the first track to generate media data of the first track. The first track can be associated with a plurality of variant tracks, each variant track including multi-view multimedia data, and performing the track derivation operation comprises performing the track derivation operation on the plurality of variant tracks to generate the media data of the first track.

In some examples, receiving the multi-view multimedia data comprises receiving stereoscopic multimedia data, wherein the stereoscopic multimedia data comprises data for both a left view and a right view of the multi-view multimedia data.

Some embodiments relate to an apparatus for encoding video data. The apparatus includes a processor in communication with memory, the processor being configured to execute instructions stored in the memory that cause the processor to encode multi-view multimedia data comprising a hierarchical track structure comprising at least a first track, wherein the first track is at a first level in the hierarchical track structure, and includes data for both a first view and a second view of the multi-view multimedia data. The instructions are configured to cause the processor to encode metadata within the first track, such that the metadata can be used to determine an extraction operation on the first track to generate first media data of a second track, wherein the first media data is for the first view, and second media data of a third track, wherein the second media data is for the second view, wherein the second track and the third track are at a second level in the hierarchical track structure above the first level of the first track.

In some examples, encoding the metadata comprises encoding stereoscopic frame packing metadata comprising data indicative of one or more parameters used to generate the first media data, the second media data, or both.

In some examples, the first track comprises a projected two-dimensional track, the second track comprises a first projected video track for the first view, and the third track comprises a second projected video track for the second view.

In some examples, encoding the multi-view multimedia data comprises encoding stereoscopic multimedia data, wherein the stereoscopic multimedia data comprises data for both a left view and a right view of the multi-view multimedia data.

There has thus been outlined, rather broadly, the features of the disclosed subject matter in order that the detailed description thereof that follows may be better understood, and in order that the present contribution to the art may be better appreciated. There are, of course, additional features of the disclosed subject matter that will be described hereinafter and which will form the subject matter of the claims appended hereto. It is to be understood that the phraseology and terminology employed herein are for the purpose of description and should not be regarded as limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 11 is a table showing metadata usage when the metadata is included in derived tracks compared to techniques that include the metadata in the variant tracks, according to some embodiments.

DETAILED DESCRIPTION OF INVENTION

Various techniques are described herein that can be used to improve existing video coding technology. The inventors have discovered and appreciated that existing track hierarchy techniques do not support multi-view data operations, such as frame packing operations. Therefore, separate hierarchies typically need to be used for each view of the multi-view data, such as separate hierarchies for the left and right views. The techniques described herein improve existing track hierarchy technologies to support multi-view data. In some embodiments, the techniques include a new track in the track hierarchy, associating metadata with the track hierarchy, derivation operations to support multi-view derivation operations (e.g., frame-packing) in the track hierarchy, and/or the like. For example, incorporating multi-view operations such as frame-packing can reduce the number of operations required to encode and/or decode multi-view media. As another example, storing frame-packing metadata (e.g., prol and/or pror, as discussed further herein, which can be included at a level above frame-packing) in a manner that leverages the track hierarchy can provide for recovering directional frames (e.g., left and right frames) from a frame-packed track, since otherwise without the frame-packing metadata the track hierarchy would not include metadata needed to decode frame-packed content to produce stereoscopic views.

In the following description, numerous specific details are set forth regarding the systems and methods of the disclosed subject matter and the environment in which such systems and methods may operate, etc., in order to provide a thorough understanding of the disclosed subject matter. In addition, it will be understood that the examples provided below are exemplary, and that it is contemplated that there are other systems and methods that are within the scope of the disclosed subject matter.

Figure 1:
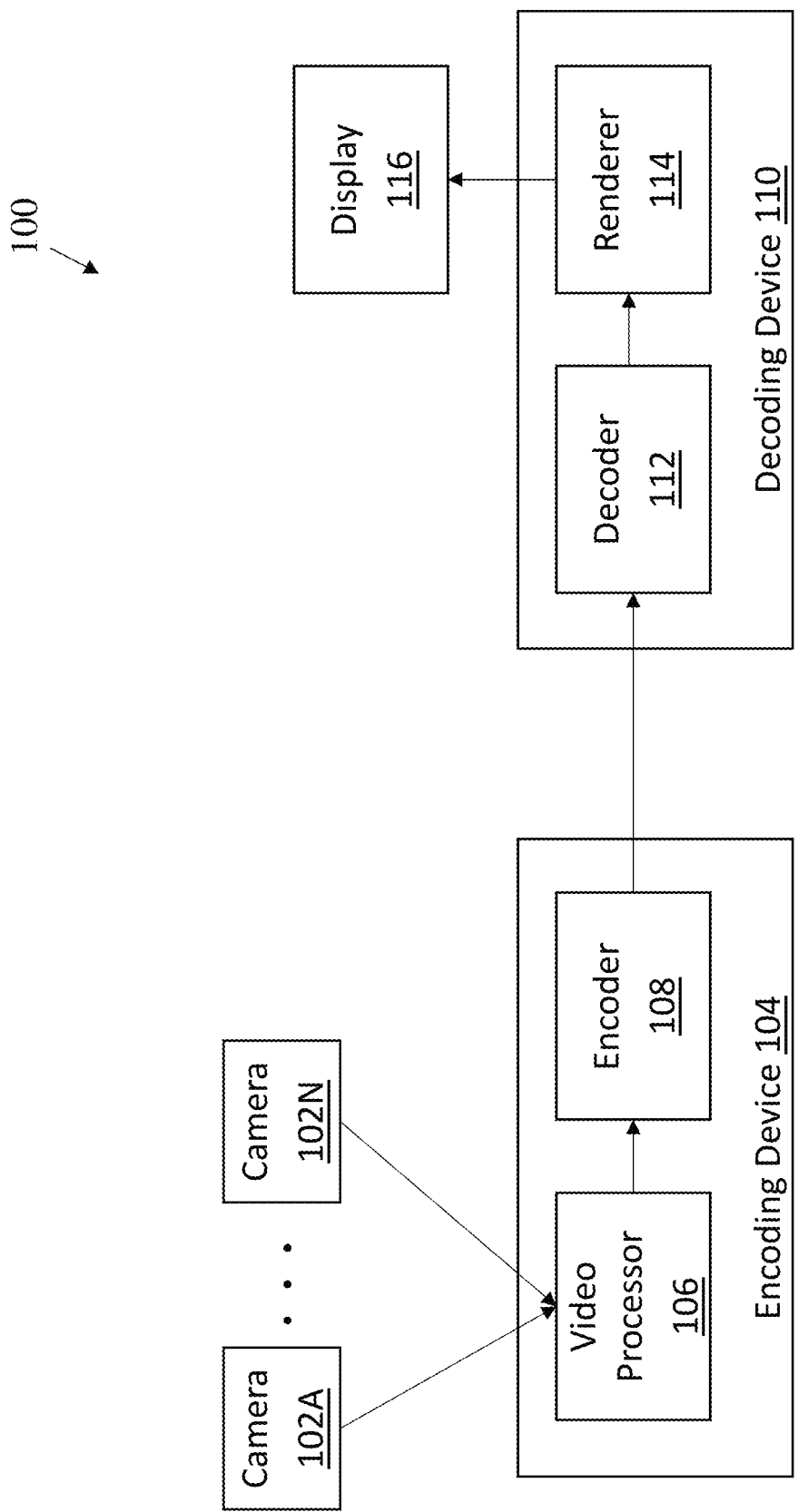
FIG. 1 shows an exemplary video coding configuration, according to some embodiments.

FIG. 1 shows an exemplary video coding configuration 100, according to some embodiments. Cameras 102A-102N are N number of cameras, and can be any type of camera (e.g., cameras that include audio recording capabilities, and/or separate cameras and audio recording functionality). The encoding device 104 includes a video processor 106 and an encoder 108. The video processor 106 processes the video received from the cameras 102A-102N, such as stitching, projection, and/or mapping. The encoder 108 encodes and/or compresses the two-dimensional video data. The decoding device 110 receives the encoded data. The decoding device 110 may receive the video as a video product (e.g., a digital video disc, or other computer readable media), through a broadcast network, through a mobile network (e.g., a cellular network), and/or through the Internet. The decoding device 110 can be, for example, a computer, a hand-held device, a portion of a head-mounted display, or any other apparatus with decoding capability. The decoding device 110 includes a decoder 112 that is configured to decode the encoded video. The decoding device 110 also includes a renderer 114 for rendering the two-dimensional content back to a format for playback. The display 116 displays the rendered content from the renderer 114.

Generally, 3D content can be represented using spherical content to provide a 360 degree view of a scene (e.g., sometimes referred to as omnidirectional media content). While a number of views can be supported using the 3D sphere, an end user typically just views a portion of the content on the 3D sphere. The bandwidth required to transmit the entire 3D sphere can place heavy burdens on a network, and may not be sufficient to support spherical content. It is therefore desirable to make 3D content delivery more efficient. Viewport dependent processing can be performed to improve 3D content delivery. The 3D spherical content can be divided into regions/tiles/sub-pictures, and only those related to viewing screen (e.g., viewport) can be transmitted and delivered to the end user.

Figure 2:
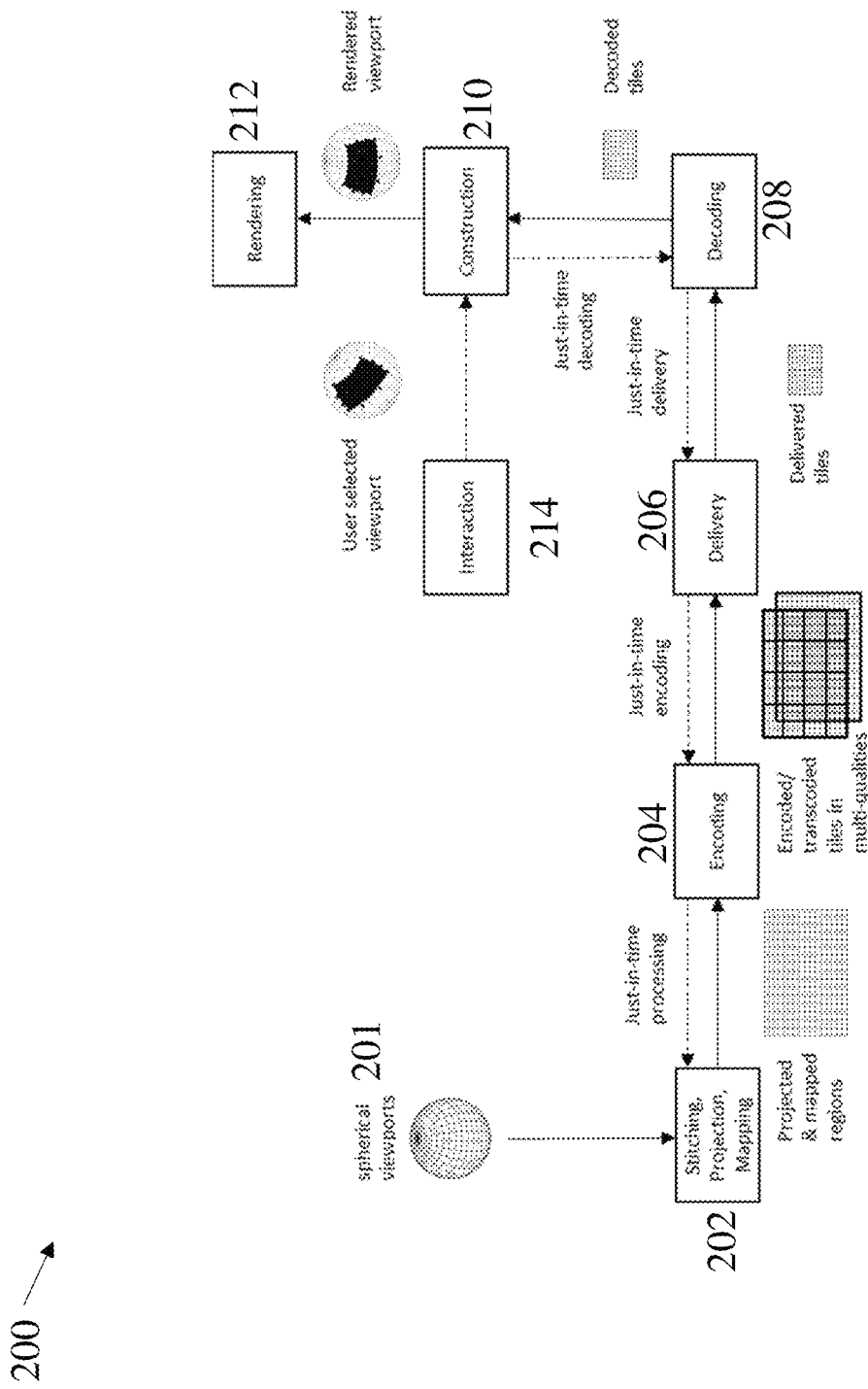
FIG. 2 a viewport dependent content flow process for virtual reality (VR) content, according to some examples.

FIG. 2 shows a viewport dependent content flow process 200 for VR content, according to some examples. As shown, spherical viewports 201 (e.g., which could include the entire sphere) undergo stitching, projection, mapping at block 202 (to generate projected and mapped regions), are encoded at block 204 (to generate encoded/transcoded tiles in multiple qualities), are delivered at block 206 (as tiles), are decoded at block 208 (to generate decoded tiles), are constructed at block 210 (to construct a spherical rendered viewport), and are rendered at block 212. User interaction at block 214 can select a viewport, which initiates a number of "just-in-time" process steps as shown via the dotted arrows.

In the process 200, due to current network bandwidth limitations and various adaptation requirements (e.g., on different qualities, codecs and protection schemes), the 3D spherical VR content is first processed (stitched, projected and mapped) onto a 2D plane (by block 202) and then encapsulated in a number of tile-based (or sub-picture-based) and segmented files (at block 204) for delivery and playback. In such a tile-based and segmented file, a spatial tile in the 2D plane (e.g., which represents a spatial portion, usually in a rectangular shape of the 2D plane content) is typically encapsulated as a collection of its variants, such as in different qualities and bitrates, or in different codecs and protection schemes (e.g., different encryption algorithms and modes). In some examples, these variants correspond to representations within adaptation sets in MPEG DASH. In some examples, it is based on user's selection on a viewport that some of these variants of different tiles that, when put together, provide a coverage of the selected viewport, are retrieved by or delivered to the receiver (through delivery block 206), and then decoded (at block 208) to construct and render the desired viewport (at blocks 210 and 212).

As shown in FIG. 2, the viewport notion is what the end-user views, which involves the angle and the size of the region on the sphere. For 360 degree content, generally, the techniques deliver the needed tiles/sub-picture content to the client to cover what the user will view. This process is viewport dependent because the techniques only deliver the content that covers the current viewport of interest, not the entire spherical content. The viewport (e.g., a type of spherical region) can change and is therefore not static. For example, as a user moves their head, then the system needs to fetch neighboring tiles (or sub-pictures) to cover the content of what the user wants to view next.

Figure 3:
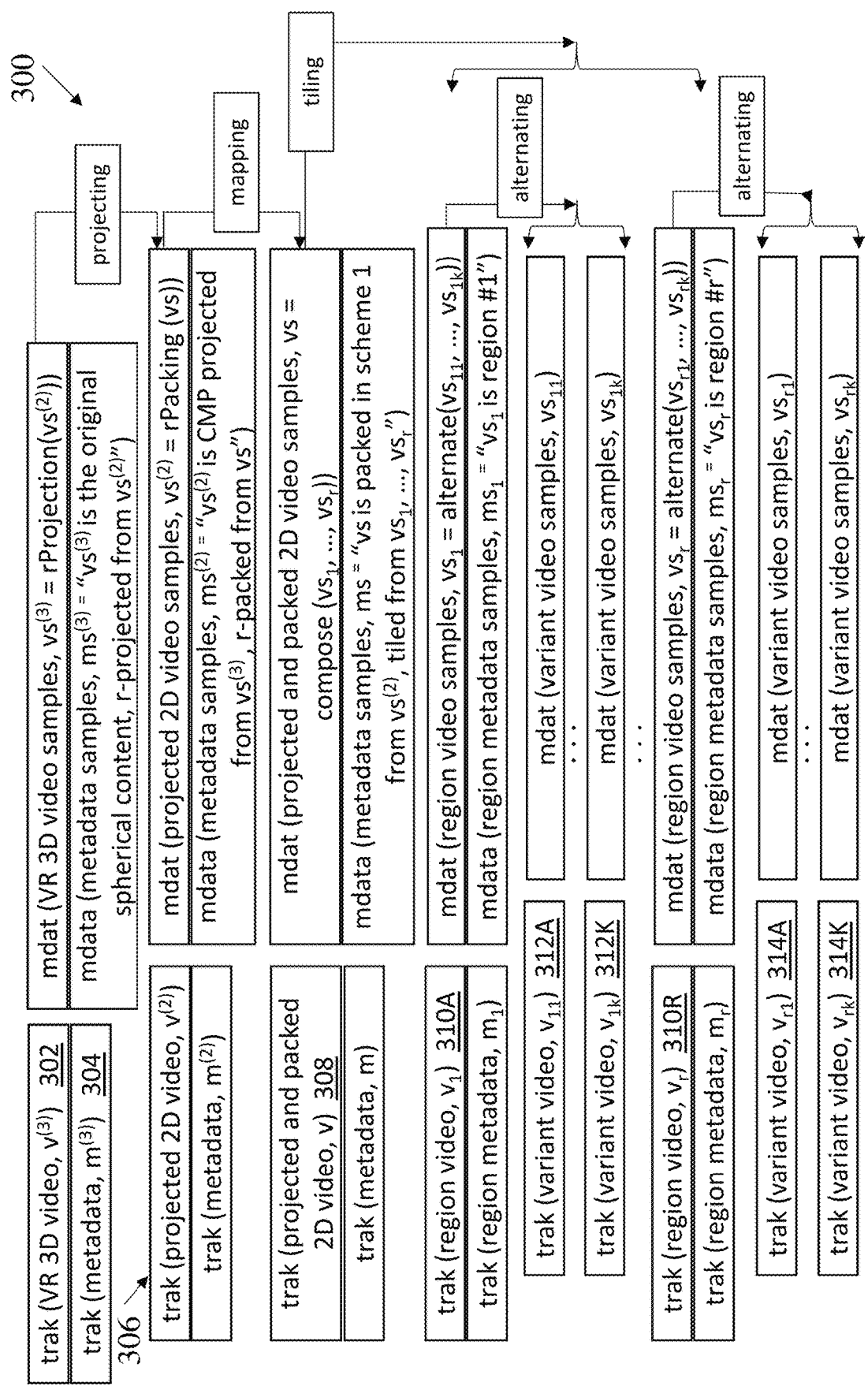
FIG. 3 shows an exemplary track hierarchical structure, according to some embodiments.

A flat file structure for the content could be used, for example, for a video track for a single movie. For VR content, there is more content that is sent and/or displayed by the receiving device. For example, as discussed herein, there can be content for the entire 3D sphere, where the user is only viewing a small portion. In order to encode, store, process, and/or deliver such content more efficiently, the content can be divided into different tracks. FIG. 3 shows an exemplary track hierarchical structure 300, according to some embodiments. The top track 302 is the 3D VR spherical content track, and below the top track 302 is the associated metadata track 304 (each track has associated metadata). The track 306 is the 2D projected track. The track 308 is the 2D big picture track. The region tracks are shown as tracks 310A through 310R, generally referred to as sub-picture tracks 310. Each region track 310 has a set of associated variant tracks. Region track 310A includes variant tracks 312A through 312K. Region track 310R includes variant tracks 314A through 314K. Thus, as shown by the track hierarchy structure 300, a structure can be developed that starts with physical multiple variant region tracks 312, and the track hierarchy can be established for region tracks 310 (sub-picture or tile tracks), projected and packed 2D tracks 308, projected 2D tracks 306, and VR 3D video tracks 302, with appropriate metadata tracks associated them.

In operation, the variant tracks include the actual picture data. The device selects among the alternating variant tracks to pick the one that is representative of the sub-picture region (or sub-picture track) 310. The sub-picture tracks 310 are tiled and composed together into the 2D big picture track 308. Then ultimately the track 308 is reverse-mapped, e.g., to rearrange some of the portions to generate track 306. The track 306 is then reverse-projected back to the 3D track 302, which is the original 3D picture.

The exemplary track hierarchical structure can include aspects described in, for example: m39971, "Deriving Composite Tracks in ISOBMFF", January 2017 (Geneva, CH); m40384, "Deriving Composite Tracks in ISOBMFF using track grouping mechanisms", April 2017 (Hobart, AU); m40385, "Deriving VR Projection and Mapping related Tracks in ISOBMFF;" m40412, "Deriving VR ROI and Viewport related Tracks in ISOBMFF", MPEG 118$^{th}$ meeting, April 2017, which are hereby incorporated by reference herein in their entirety. In FIG. 3, rProjection, rPacking, compose and alternate represent the track derivation TransformProperty items reverse 'proj', reverse 'pack', 'cmpa' and 'cmp1', respectively, for illustrative purposes and are not intended to be limiting. The metadata shown in the metadata tracks are similarly for illustrative purposes and are not intended to be limiting. For example, metadata boxes from OMAF can be used as described in w17235, "Text of ISO/IEC FDIS 23090-2 Omnidirectional Media Format," 120th MPEG Meeting, October 2017 (Macau, China), which is hereby incorporated by reference herein in its entirety.

The number of tracks shown in FIG. 3 is intended to be illustrative and not limiting. For example, in cases where some intermediate derived tracks are not necessarily needed in the hierarchy as shown in FIG. 3, the related derivation steps can be composed into one (e.g., where the reverse packing and reverse projection are composed together to eliminate the existence of the projected track 306).

Figure 4:
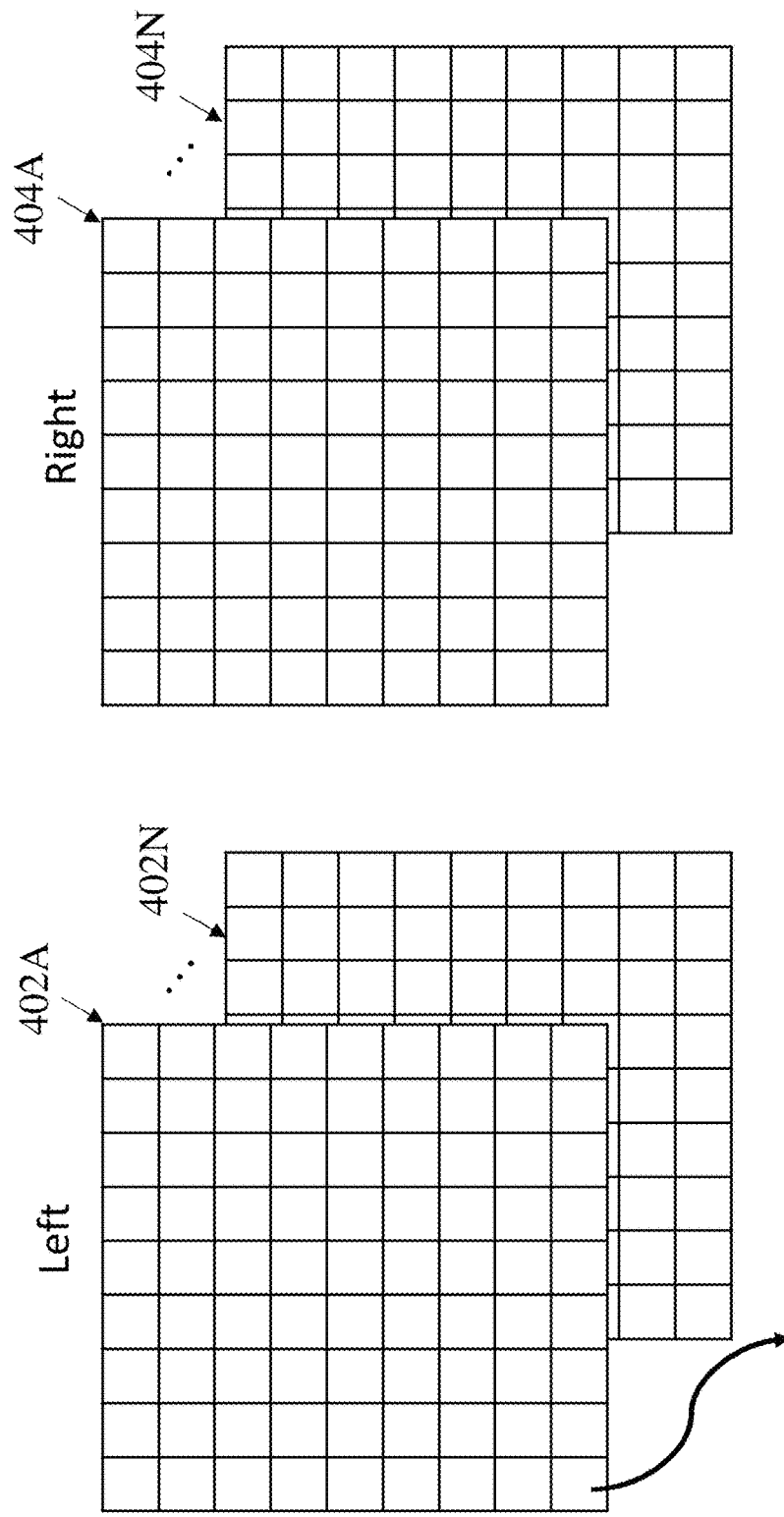
FIG. 4 shows sequences of left stereo pictures and right stereo pictures for stereoscopic video, according to some examples.

FIG. 4 shows sequences of left stereo pictures 402A-402N (collectively referred to as left stereo pictures 402) and right stereo pictures 404A-404N (collectively referred to as right stereo pictures 404) for stereoscopic video, according to some examples. Each picture 402, 404 in this example is divided into a nine by nine grid of sub-pictures. According to some techniques, metadata/attributes are specified for each sub-picture. For example, each sub-picture can include metadata to indicate its sub-picture track, data related to its projection, the larger picture which the sub-picture belongs to, the quality of the sub-picture, and/or the like. The metadata can be specified in a metadata box. As shown in FIG. 4, the metadata can include a stereo video group metadata box StereoVideoGroupBox (ster) 410, a projected omnidirectional video metadata box ProjectedOmniVideoBox (povd) 412, a RegionWisePackingBox (rwpk) 414, a TwoDimensionalSpatialRelationship (2dcc) 416, and a VariantPictureBox (vpct) 418. These boxes are intended to be illustrative and not limiting, as other metadata boxes can be used as well.

Figure 5:
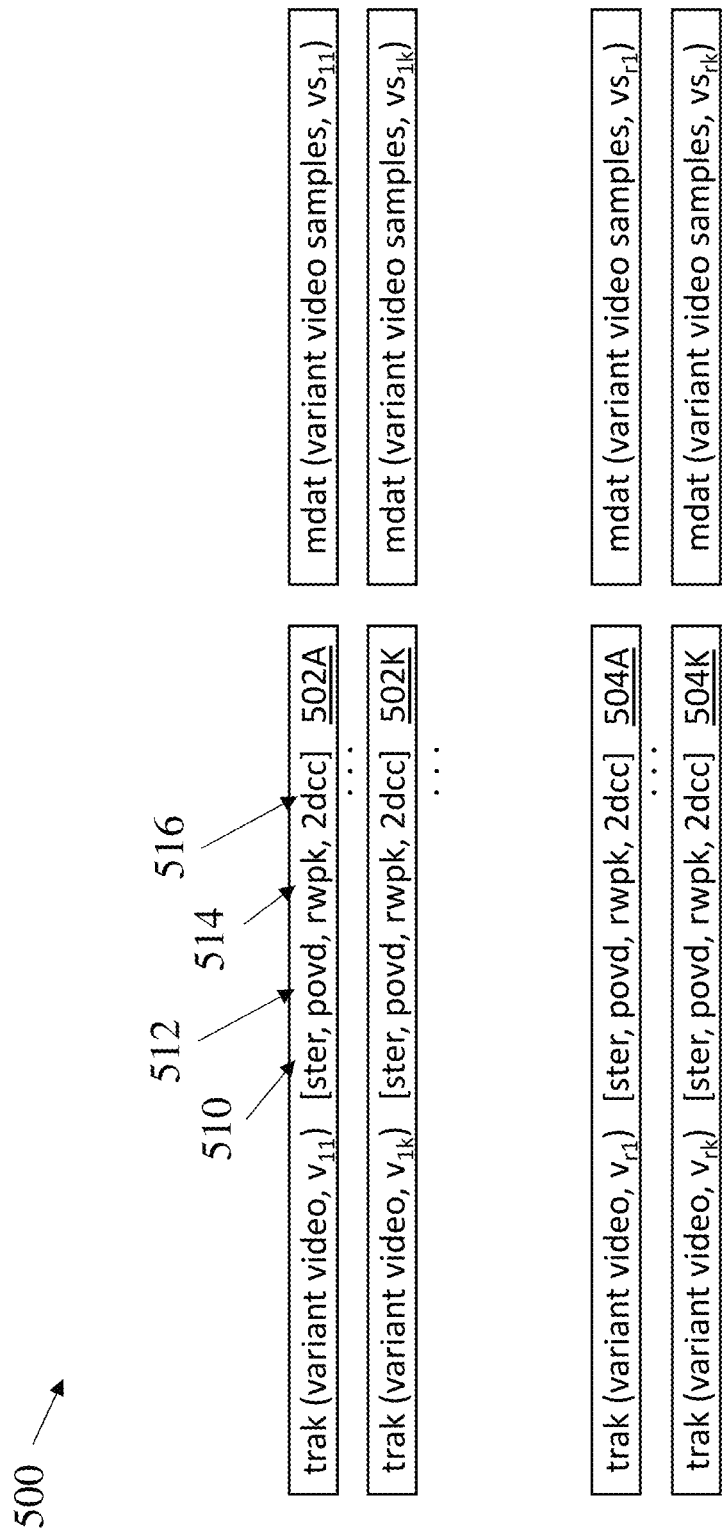
FIG. 5 shows exemplary metadata storage with variant tracks, according to some examples.

Some techniques store this metadata with each sub-picture in the sub-picture tracks (e.g., variant region tracks 312). FIG. 5 shows exemplary metadata storage with variant tracks, according to some examples. As discussed in conjunction with FIG. 3, each region track includes an associated set of variant tracks. As shown in FIG. 5, a first region track (not shown for simplicity) includes variant tracks 502A through 502K (collectively referred to as variant tracks 502). A second region track (also not shown) includes variant tracks 504A through 504K (collectively referred to as variant tracks 504). Each variant track 502, 504 stores metadata, including in this non-limiting example a StereoVideoGroupBox ster 510, a projected omnidirectional video metadata box ProjectedOmniVideoBox (povd) 512, a RegionWisePackingBox (rwpk) 514, and a TwoDimensionalSpatialRelationship (2dcc) 516.

The StereoVideoGroupBox (ster) 510 can specify attributes and/or metadata related to stereoscopic video track grouping. The ster 510 can include, for example, the syntax specified in OMAF for the StereoVideoGroupBox. For example, ster 510 can indicate whether the track is either the left or right view of a stereo pair suitable for playback on a stereoscopic display. For example, a Boolean can be used, where a 0 value indicates the right view of a stereo pair, and a 1 value indicates the left view of a stereo pair. In some embodiments, the tracks that have the same track group identifier form a stereo pair.

The ProjectedOmniVideoBox (povd) 512 can be used to specify attributes and/or metadata for restricted video schemes for omnidirectional video. The povd 512 can include, for example, the syntax specified in OMAF for the ProjectedOmniVideoBox. For example, povd 512 can indicate the projection format of the projected picture (e.g., C for monoscopic video contained in the track, CL and CR for left and right view of stereoscopic video, and/or the like), region-wise packing (e.g., when applicable), the rotation for conversion between the local coordinate axes and the global coordinate axes (e.g., if applied), the content coverage of the track, and/or the like. In some embodiments, the povd 512 box is referred to as the PROJ box.

The RegionWisePackingBox (rwpk) 514 can include attributes and/or metadata related to storage of omnidirectional images. The region-wise packing data can specify a mapping between packed regions and the corresponding projected regions, the location and size of the guard bands, if any, and/or the like. The rwpk 514 can include, for example, the syntax specified in OMAF for the RegionWisePackingBox. In some examples, the rwpk 514 includes a RegionWisePackingStruct, as also specified in OMAF. For example, the RegionWisePackingStruct can include data indicative of the width and height of the projected picture, the width and height of the packed picture, data for stereoscopic projected pictures, data for each of the projected regions and packed regions in both constituent pictures or to a projected region and the respective packed region (e.g., one or more of data indicating the presence of guard bands, the packing type, the mapping between a projected region and the respective packed region in the rectangular region packing structure, the guard bands, if any, etc.), and/or the like.

The TwoDimensionalSpatialRelationship (2dcc) 516 can specify attributes and/or metadata related to two dimensional relationships. For example, the metadata can indicate that the track belongs to a group of tracks with 2D spatial relationships (e.g., corresponding to planar spatial parts of a video source). The 2dcc 516 can specify a coordinate system (e.g., including a width and/or height), the source of the tracks, and/or the like. In some embodiments, the 2dcc box is referred to as the sub-picture composition box (spco) box.

The inventors have discovered and appreciated deficiencies with existing technology related to video coding, and in particular to supporting multi-view media, such as stereoscopic media. In particular, a track hierarchy can be used to encode and/or decode multimedia data. However, existing track hierarchy techniques do not support multi-view operations, such as frame-packing operations, and therefore separate track hierarchies are required to represent each view of multi-view multimedia (e.g., separate hierarchies for each of the left and right views of stereoscopic media). For example, in order to encode data for both the left and right views of stereoscopic video, two separate processes are needed to encode each view in its associated hierarchical track, and similarly two separate processes are needed to decode such encoded data.

Further, existing techniques require defining a significant number of metadata for each video, such as for stereo video. For example, if each picture is a nine by nine grid of sub-pictures as shown in FIG. 4, then for each left and right stereo pair there are 2×9×9×5 sub-pictures, or 810 sub-pictures total. If each sub-picture has five metadata boxes as shown in FIG. 5, then 810 sub-pictures×5 metadata boxes equals 4050 metadata boxes in total. Therefore, if each sub-picture carries all of these metadata boxes, such techniques can result in a significant number of metadata boxes being defined and stored for each stereo pair. The inventors have also appreciated that if all metadata is stored at the sub-picture level, it can be difficult to determine how each sub-picture track relates to other tracks. For example, if a decoder needs to process an entire picture, then the decoder may need to go through all of the tracks to figure out which variant tracks are the variant tracks of the same sub-picture, and so on. The inventors have discovered and appreciate that such metadata redundancy can be further compounded for multi-view media. For example, since separate hierarchies are required for each view, the separate hierarchies require storing data and metadata for the separate hierarchical tracks.

The techniques disclosed herein provide for hierarchical track derivation techniques that supporting multi-view media content (e.g., stereoscopic content, such as stereoscopic OMAF media content). The techniques provided herein improve existing track hierarchy technologies by adding support for frame-packing operations, associated metadata, derivation operations, and/or the like. For example, the techniques can include providing a new track hierarchy structure that supports frame packing operations. The techniques can include providing a new track in the track hierarchy that represents the frame packed track. Subsequent tracks in the hierarchy below the frame packed track can operate on the frame packed data, and therefore can leverage a single track and associated derivation operations (e.g., rather than two or more, when using separate hierarchies for each view). As described further herein, adding support for frame-packing can consolidate otherwise redundant metadata and/or reduce the number of encoding/decoding operations that would otherwise be required when using traditional hierarchical structures.

The techniques can also include leveraging the track hierarchy structure both store metadata related to frame packing operations and/or other multi-view operations, as well as to store metadata in the tracks at appropriate track hierarchy levels in derived media tracks. For example, as discussed further herein, the new track for the frame packed data can include associated metadata used for performing frame packing derivation operations. Additionally, the techniques can associate, store, and signal sub-picture track related attributes and/or metadata to appropriate derived tracks in the hierarchy (e.g., rather than using a flat structure to specify the metadata at the sub-picture level, as shown in FIG. 5). The techniques can inherit other metadata stored in derived media tracks from the top of the hierarchy downwards, rather than storing metadata in each and every variant sub-picture track. Since the track hierarchy structure with support for frame packing consolidates otherwise redundant tracks and associated metadata and derivation operations, the improved track hierarchy further reduces metadata and other overhead required to support entirely separate hierarchies, encoding processes, and/or decoding processes. The techniques can be consistent with the OMAF file decoding and rendering processes, with metadata being associated, stored and signaled in a much more appropriate, logical and efficient manner for multi-view media.

Figure 6A:
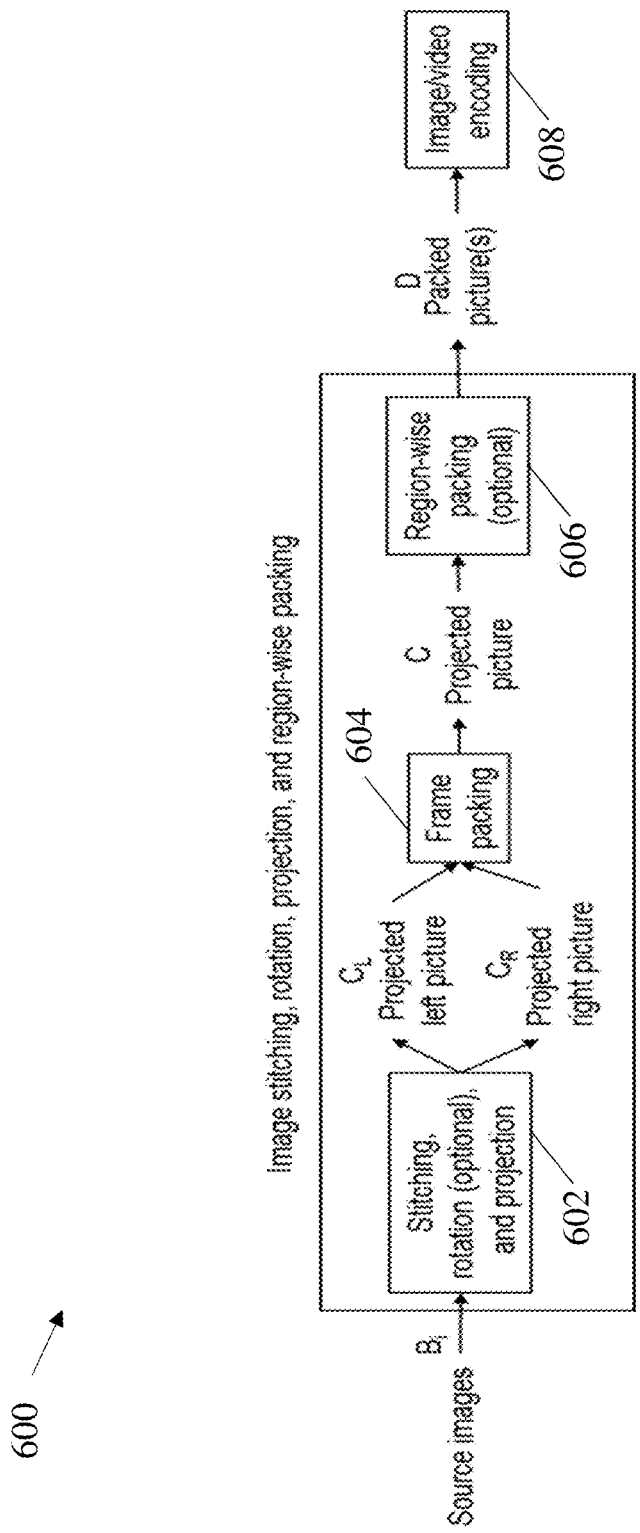
FIG. 6A shows an exemplary sequence of operations that includes frame packing, according to some embodiments.

To process stereoscopic content for image or video encoding, various operations including image stitching, rotation, projection, frame packing and/or region-wise packing operations can be performed on the source images of the stereoscopic content to map both views onto the same packed picture. For example, for stereoscopic content, the 3D source images can be for two different 3D spheres (one for each of the left and right views), and so once the spherical content is projected to a 2D plane, there are two separate projected pictures (e.g., again, one for each of the left and right views). It can be desirable to make a single track out of the two projected tracks, which can be done using frame packing. FIG. 6A shows an exemplary sequence of operations 600 that includes frame packing, according to some embodiments. At step 602, the source images $B_i$ are stitched, possibly rotated, and projected onto two unit spheres, one for each eye. The image data on each unit sphere is further arranged onto a two-dimensional projected picture, shown as $C_L$ for the left eye and $C_R$ for the right eye, which covers the entire sphere. At step 604, frame packing is applied to pack the left view picture and right view picture onto the same projected picture C. Optionally, at step 606 region-wise packing can be applied to pack the projected picture C onto a packed picture, and the packed picture (D) is given as input to the image/video encoding process 608. If the region-wise packing is not applied, the packed picture is identical to the projected picture, and this picture is given as input to image/video encoding. The packed picture D may cover only a part of the entire sphere.

As shown in FIG. 6A, in some embodiments the projected picture C for stereoscopic media content has been frame packed at step 604. In some embodiments, the projected picture C contains information of the frame packing arrangement of the projected left and right pictures $C_L$ and $C_R$. For example, in OMAF the projected picture C can include information of the frame packing arrangement within the StereoVideoBox contained within the SchemeInformationBox. In some embodiments, the absence of information of a frame packing arrangement (e.g., the absence of a StereoVideoBox) can indicate that the content of the track is monoscopic, such as indicating that omnidirectionally projected content of the track is monoscopic.

Figure 6B:
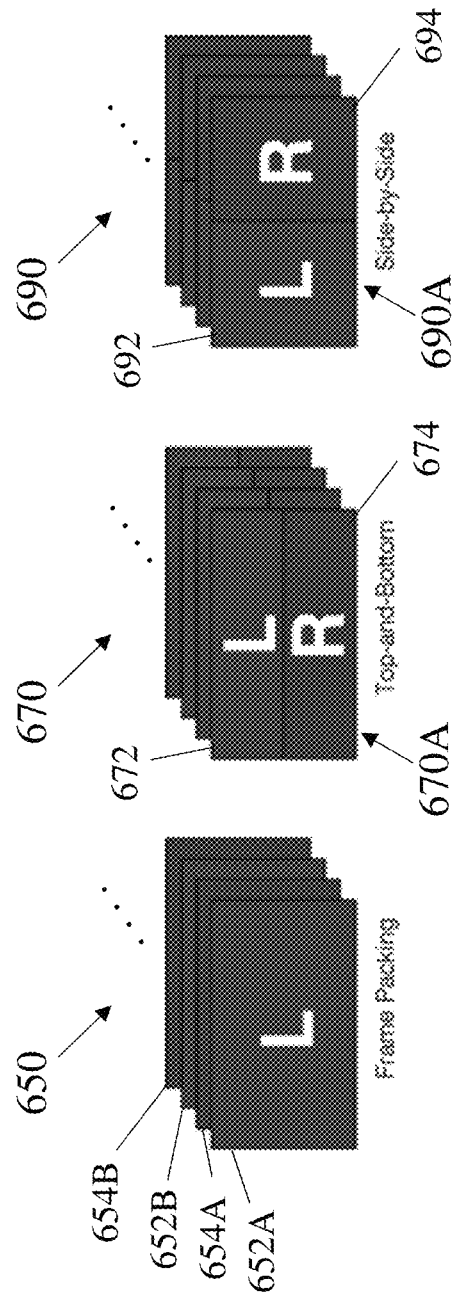
FIG. 6B shows examples of frame packing arrangements, according to some embodiments.

FIG. 6B shows examples of frame packing arrangements, according to some embodiments. Arrangement 650 shows a temporal interleaving frame packing arrangement that includes alternating frames from each view, illustrated as left frames 652A and 652B interleaved with right frames 654A and 654B. Arrangement 650 may include information to indicate that each pair of frames are a single sample in the track, such that when the track is processed, decoding the sample requires performing two decoding operations. Arrangement 670 shows a top-bottom frame packing arrangement in which the left frames are packet on top of right frames. For example, the first frame packed arrangement 670A includes the left frame 672 packed on top of the right frame 674. Arrangement 690 shows a side-by-side frame packing arrangement in which the left frames are packed to the side of the right frames. For example, the first frame packed arrangement 690A includes the left frame 692 packed to the left of the right frame 694. Since arrangements 670 and 690 combine sets of frames into a single frame, the arrangements can require only one decoding operation (e.g., compared to arrangement 650).

As described herein, information of the packing arrangement can be associated with the projected picture. For example, for OMAF, when a StereoVideoBox is present in the SchemeInformationBox for the omnidirectional video scheme, the first byte of the stereo_indication_type can indicate the frame packing arrangement, as described in w17399, "Revised text of ISO/IEC FDIS 23090-2 Omnidirectional Media Format," 121st MPEG Meeting, January 2018. Gwangju, Korea, which is hereby incorporated by reference herein in its entirety. For example, a value of 3 can indicate a top-bottom frame packing arrangement, a value of 4 can indicate a side-by-side frame packing arrangement, or a value of 5 can indicate a temporal interleaving of alternating first and second constituent frames.

Figure 7:
FIG. 7 shows an exemplary table of hierarchical track levels and associated metadata and transform properties that can be used to build a track derivation hierarchy, according to some embodiments.

As described herein, a series of transform properties can be used to build a track derivation hierarchy that supports both monoscopic and multi-view media content, such as stereoscopic content. FIG. 7 shows an exemplary table 700 of hierarchical track levels 702 and associated metadata 706 and transform properties 708 that can be used to build a track derivation hierarchy, according to some embodiments. Level 6, the top-most level, is a spherical track, which can be derived (e.g., from a level 5 spherical picture track, discussed further herein) using a sample VR viewport transformation, such as 'svpt.' For example, the 'svpt' transformation can be used to construct or extract a viewport sample image from an input VR sample image item according to a viewport definition, such as the one for spherical viewports given in OMAF.

The remaining track levels 0-5 in FIG. 7 will be discussed in conjunction with FIGS. 8A-8B, which show an exemplary track hierarchical structure 800 used for stereoscopic multimedia, according to some embodiments. Level 5 is the spherical picture track, shown in FIG. 8A as track 802 for the left spherical picture track and track 804 for the right spherical picture track. Below each track 802 and 804 is the associated metadata track 806 and 808 (each track has associated metadata, as shown and discussed further below). The spherical picture track can include medatada relating to the shape of the sphere region specified by the samples, such as a shape type, the range, azimuth, elevation, and/or other parameters related to the shape of the sphere region. For example, the SphereRegionConfigBox 'rosc' can be used to specify information regarding the shape of the sphere region, such as the shape type (e.g., specified by four great circles, two azimuth circles and two elevation circles, etc.), whether the range is dynamic for each sample, an azimuth range, an elevation range, a number of regions, and/or the like. The transform property associated with level 5 is a projection 'proj.' The spherical picture track is projected to generate the next track in the hierarchy (e.g., Level 4), and/or the lower-level is reverse projected to generate the spherical picture track.

Level 4 is the projected picture track. Each spherical picture track is associated with a projected picture track. As shown in FIG. 8A, the left spherical picture track 802 is projected to create the left projected 2D picture track 810, and the right spherical picture track 804 is projected to create the right projected 2D picture track 812. The left and right picture tracks can include metadata that indicates how the decoded frame includes the stereo pairs (e.g., whether decoded frames contain a representation of two spatially packed constituent frames that form a stereo pair or contain one of two views of a stereo pair). For example, the stereo video box 'stvi' can be used to indicate that decoded frames either contain a representation of two spatially packed constituent frames that form a stereo pair or contain one of two views of a stereo pair, as specified in ISO/IEC 14496-12, Information Technology—Coding of Audio-Visual Objects, Part 12: ISO Base Media File Format (ISOBMFF), $5^{th}$ Ed., Feb. 20, 2015, which is hereby incorporated by reference herein in its entirety. The 'stvi' box can include data indicative of how the content can be displayed (e.g., stereoscopic display, a monoscopic single-view, etc.), a stereo scheme, a stereo arrangement type, and/or the like. As explained further herein, 'prol' and 'pror' define two respective derived tracks, one being the projected left picture track and the other being the projected right picture track. Thus, the left 2D picture track 810 can be associated with the projected left picture 'prol' transform property, and the right 2D picture track 812 can be associated with the projected right picture 'pror' transform property.

Level 3 is the projected picture track. Track 814 is a projected 2D picture track formed by performing a frame packing operation on the left projected 2D video track 810 and the right projected 2D video track 812. Thus, while each left and right view includes a separate spherical picture track and projected picture track, the projected picture tracks are combined into a single track 814 via frame packing. The projected 2D picture track 814 can include metadata related to the projection format of the projection picture, region-wise packing, any rotation for conversion between the local and global coordinate axes, the content coverage, and/or the like. For example, the projected 2D picture track 814 can include the projected omnidirectional video box 'povd' box discussed herein and/or as specified in, for example, w18227, which is a working draft of the second edition of the OMAFG specification, ISO/IEC JTC1/SC29/WG11 N18227-v1, January 2019, Marrakech, Mass., which is hereby incorporated by reference herein in its entirety. The projected 2D picture track 814 is associated with the packing 'pack' transform property.

Level 2 is the packed picture track. The track 816, shown in FIG. 8B, is the projected and packed 2D big picture track. The projected and packed 2D big picture track 816 can include metadata related to the mapping between packed regions and the corresponding projected regions, the location and size of the guard bands, and/or the like. For example, the projected and packed 2D big picture track 816 can include the region-wise packing box 'rwpk' as described herein and/or as discussed in w18227. The projected and packed 2D big picture track 816 is associated with the composite of all 'cmpa' transform property.

Level 1 is the sub-picture track, or region track. The region tracks are shown as tracks 818A through 818R, generally referred to as sub-picture tracks 818. The sub-picture tracks 818 can include composition metadata. The sub-picture tracks 818 can be associated with the composite of only one 'cmp1' transform property, discussed further herein.

In some embodiments, the sub-picture tracks 818 can include the sub-picture composition box 'spco.' TrackGroupTypeBoxes with the track_group_type equal to 'spco' indicates that the track belongs to a composition of tracks that can be spatially arranged to obtain composition pictures. The visual tracks mapped to this grouping (e.g., the visual tracks that have the same value of track_group_id within TrackGroupTypeBox with track_group_type equal to 'spco') collectively represent visual content that can be presented. Each individual visual track mapped to this grouping may or may not be intended to be presented alone without other visual tracks, while composition pictures are suitable to be presented. A composition picture can be derived by spatially arranging the decoding outputs of the composition-aligned samples of all tracks belonging to the same sub-picture composition track group and belonging to the same alternative group.

In some embodiments the 'spco' box can include a sub-picture region box that specifies various parameters, such as track_x, track_y, track_width, track_height, and/or composition_height, and/or the like. In some examples, track_x specifies, in luma sample units, the horizontal position of the top-left corner of the samples of this track on the composition picture. The value of track_x can be in the range of 0 to composition_width-1, inclusive. In some examples, track_y specifies, in luma sample units, the vertical position of the top-left corner of the samples of this track on the composition picture. The value of track_y can be in the range of 0 to composition_height-1, inclusive. In some examples, track_width can specify, in luma sample units, the width of the samples of this track on the composition picture. The value of track_width can be in the range of 1 to composition_width-1, inclusive. In some examples, track_height can specify, in luma sample units, the height of the samples of this track on the composition picture. The value of track_height can be in the range of 1 to composition_height-1, inclusive. In some examples, composition_width can specify, in luma sample units, the width of the composition picture. The value of composition_width can be the same in all instances of SubPictureCompositionBox with the same value of track_group_id. In some embodiments, composition_height can specify, in luma sample units, the height of the composition picture. The value of composition_height can be the same in instances of SubPictureCompositionBox with the same value of track_group_id.

In some embodiments, the rectangle represented by track_x, track_y, track_width, and track_height can be referred to as the sub-picture rectangle of the track. For tracks belonging to the same sub-picture composition track group and belonging to the same alternate group (e.g., having the same non-zero alternate_group value), the position and size of the sub-picture rectangles can be the same. In some embodiments, the composition picture of a sub-picture composition track group can be derived by first picking one track from each alternate group out of all tracks belonging to the sub-picture composition track group. Then, for each of the picked tracks, for each value of i in the range of 0 to track_width-1, inclusive, and for each value of j in the range of 0 to track_height-1, inclusive, the luma sample of the composition picture at luma sample position ((i+track_x) % composition_width, (j+track_y) % composition_height) is set equal to the luma sample of the sub-picture of this track at luma sample position (i, j). In addition, or alternatively, when the decoded picture has a chroma format other than 4:0:0, the chroma components are derived accordingly. In some embodiments, the sub-picture rectangles of all tracks belonging to the same sub-picture composition track group and belonging to different alternate groups (i.e., having alternate_group equal to 0 or different alternate_group values) do not overlap and do not have gaps, such that in the above-described derivation process for the composition picture each luma sample position (x, y), where x is in the range of 0 to composition_width-1, inclusive, and y is in the range of 0 to composition_height-1, inclusive, is traversed just once.

Level 0 is the variant picture track (or variant sub-picture track). Each sub-picture track 818 has a set of associated variant tracks. Sub-picture track 818A includes variant tracks 820A through 820K. Sub-picture track 818R includes variant tracks 822A through 822K. The variant tracks can include the variant picture box 'vpct', which can label variant (sub-)picture tracks (e.g., using a track selection box, such as 'tsel'), and signal the labeled tracks as an alternate group of tracks. Therefore, individual tracks with a same group identifier and group type can belong to a same group that is related to a particular sub-picture track, such as tracks of a same piece of content but with different bitrates or qualities. The variant tracks can be associated with the selection of only one 'sel1' transform property.

Thus, as shown by the track hierarchy structure 800, a structure can be developed that starts with physical multiple variant region tracks (e.g., 820, 822), and the track hierarchy can be established for sub-picture tracks 818, projected and packed 2D tracks 816, a projected 2D picture track 814 (which is packed and includes both the left and right projected 2D tracks), projected left and right 2D tracks 810 and 812, and left and right VR 3D video tracks 802 and 804, with appropriate metadata tracks associated them. Of note, the hierarchy 800 allows a reverse-mapping from track 816 to track 814, and then a reverse frame packing or any other extraction operation to get the left (L) and right (R) projected 2D tracks 810 and 812. Then each of the 2D tracks is reverse-projected, as described herein. Without including the additional level that allows mapping/reverse-mapping, two entirely separate hierarchies would be required (e.g., as shown in FIG. 3) such that a separate hierarchy is used for each left or right view. Using a hierarchy that can allow, for example, stereoscopic operations such as mapping/reverse-mapping, which can therefore avoid redundant operations that would otherwise be required for two hierarchies (e.g., requiring two mapping, tiling/composing, and alternating steps, rather than just one, as shown in FIGS. 8A-8B).

Figure 8A:
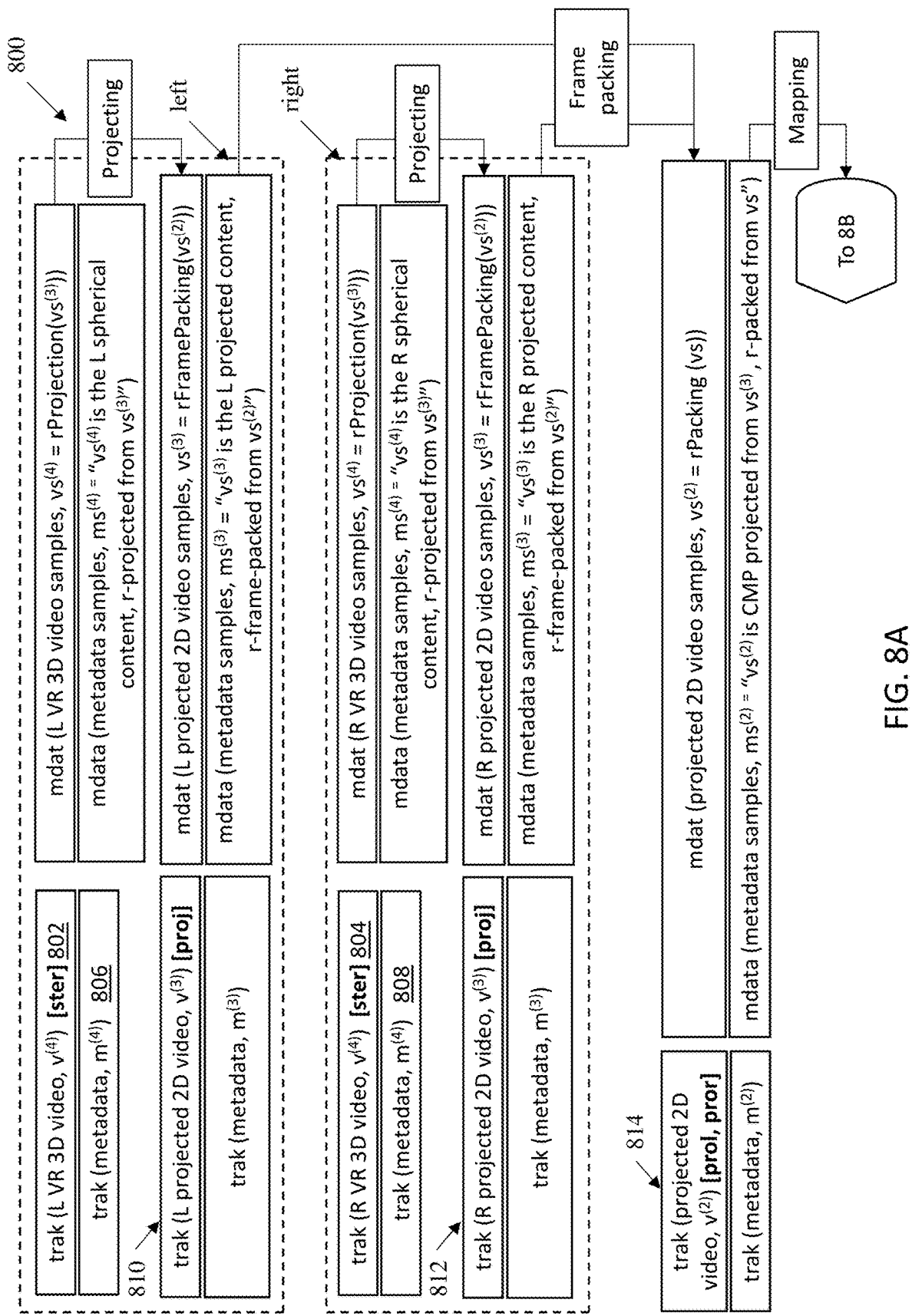
FIGS. 8A-8B show an exemplary track hierarchical structure, according to some embodiments.

While FIG. 8A shows the left 3D video track 802 and the left projected 2D video track 810 above the right 3D video track 804 and the right projected 2D video track 812, this is done for illustrative purposes. In terms of the track hierarchy, the left 3D video track 802 and the right 3D video track 804 can be considered at the same level of the hierarchy. Additionally, the left projected 2D video track 810 and the right projected 2D video track 812 can be considered at the same level of the hierarchy (e.g., which is one level below the left 3D video track 802 and the right 3D video track 804, and one level above the frame packed projected 2D video track 814.

Figure 8B:
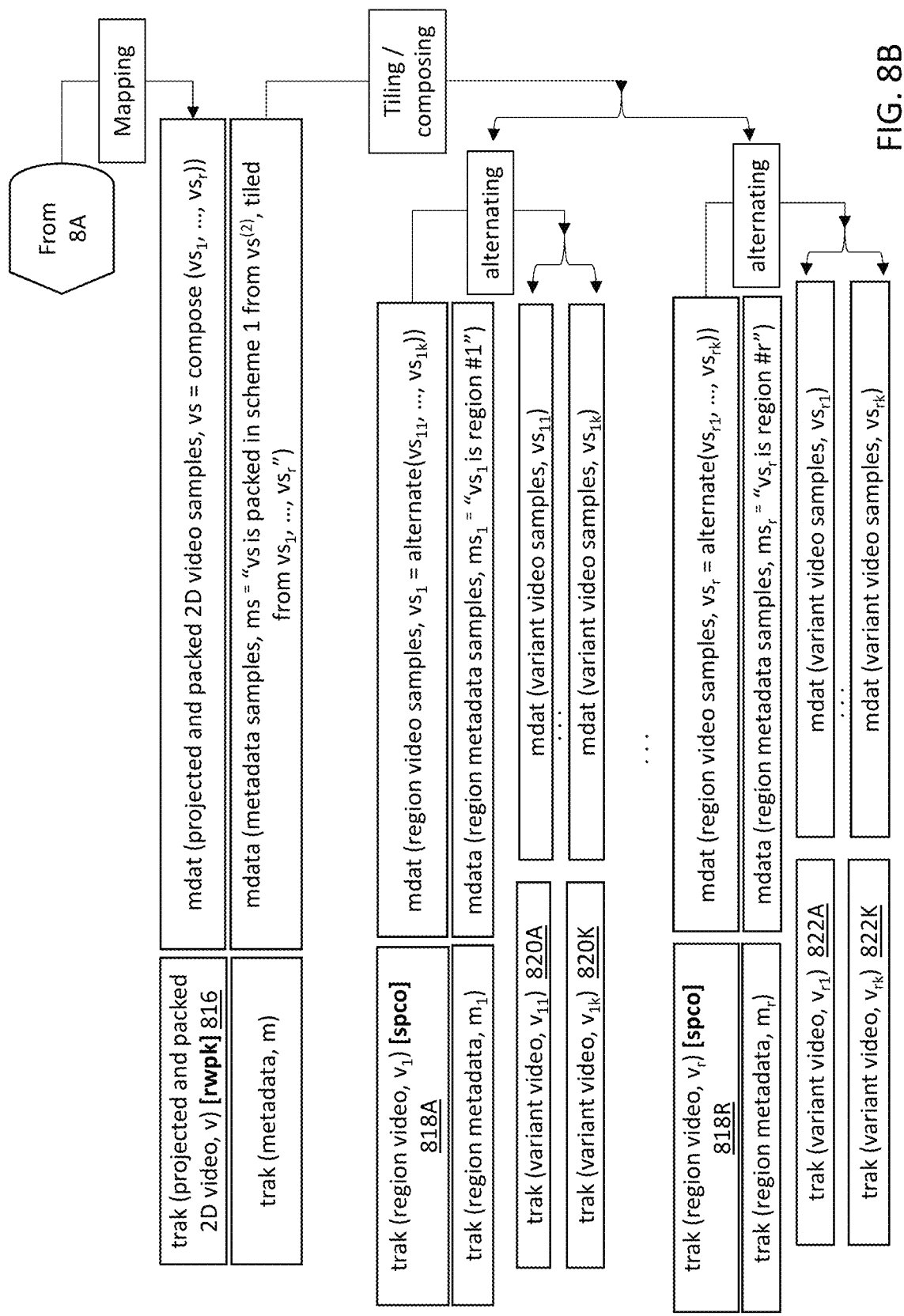

Additionally, rather than specifying all attributes and/or metadata at the variant track level in the variant tracks (e.g., as shown in FIG. 5), FIG. 8A-8B shows an encoding scheme where attributes and/or metadata can be specified in derived tracks at associated levels in the track hierarchy. Of note, in this non-limiting example, metadata can be carried in the packed 2D track 814 that is related to performing a reverse-packing operation and can be used to introduce new track derivations accordingly. As an illustrative example, for OMAF, the ProjectedLeftPicture transform property 'prol' and ProjectedRightpicture transform property 'pror' can be applied to a projected picture track for stereoscopic OMAF content. For both transform properties, the input projected picture track contains a StereoVideoBox specified in ISO/IEC 14496-12, and/or the frame packing item property specified in w17399 (e.g., which has the same syntax and semantics of the StereoVideoBox).

As shown in FIGS. 8A-8B, additional metadata can be specified in other tracks. In this non-limiting example, the 'ster' metadata box is provided in the left VR 3D video track 802 and the right VR 3D video track 804. The 'povd' metadata box is provided in the left and right 2D tracks 808 and 810. The 'rwpk' metadata box is provided in the projected and packed 2D track 816. The '2dcc' metadata box is provided in each of the tracks 818 (sub-picture or tile tracks). These metadata boxes are described for exemplary purposes only, as other metadata and/or metadata structures can be used, such as the other metadata boxes described herein.

As shown in FIGS. 8A-8B, the metadata stored in the derived tracks are separate and distinct from the timed metadata tracks 806. Unlike the metadata boxes specified in the derived tracks of the hierarchy, as discussed further herein, the timed metadata tracks 806 are file format tracks separate from the variant and derived tracks. The timed metadata tracks 806 are typically used for different purposes than metadata within the derived tracks. For example, unlike metadata that can be provided within metadata boxes within media tracks, the timed metadata tracks 806 can be used to provide metadata with timing information that can be synchronized with time-variant media data within the media tracks referenced by the timed metadata tracks. Such an external timed metadata track reference mechanism can, for example, make it possible to generate the media tracks and timed metadata tracks separately and provide a many-to-many (m-to-n) association relationship among the media and timed metadata tracks. For example, multiple spherical regions of interest can be specified as timed metadata for a number of derived spherical media content (e.g., according to editors cuts, end-users' popular choices, and/or the like).

Unlike the timed metadata tracks 806, the techniques described herein use metadata in metadata boxes within the derived tracks. As explained herein, derived tracks at the various levels of the hierarchy may not have media data, which is carried in the variant tracks. By including metadata boxes in the derived tracks in accordance with the techniques described herein, the metadata can be associated with the particular variant tracks associated with the derived track through the track hierarchy (e.g., even if the variant track itself does not carry the media data). The metadata in the derived tracks can specify metadata used for the track derivation operations (e.g., frame packing, projecting, mapping, tiling, etc.). In particular, the techniques described herein can be used to specify metadata for derivation operations used to derive the multiple tracks of multi-view media, such as derivation operations to derive the left and right 2D tracks of stereoscopic media. In contrast, the timed metadata is typically not used for derivation operations, and can be ignored entirely when performing derivation operations. Timed metadata also cannot be specified in a manner such that it can be associated with the underlying media data included in different tracks in the hierarchy.

As shown in FIGS. 8A-8B, the hierarchical metadata storage can add support for frame packing in the track derivation hierarchy and manage associated metadata (e.g., ProjectedLeftPicture and ProjectedRightPicture) that applies to the entire composition picture and to the frame packing derivation operations from metadata (e.g., TwoDimensionalSpatialRelationship and VariantPictureBox) that applies to a sub-picture track alone and/or other metadata that applies to other tracks of the hierarchy (e.g., ProjectedOmniVideoBox and RegionWisePackingBox). The hierarchical metadata storage can avoid duplication of metadata declarations causing unnecessary byte count overhead. The hierarchical metadata storage can maintain backward compatibility with parsers ignoring sub-picture composition signaling (e.g., only VariantPictureBox is stored in tracks with media content, ignoring this signaling would be able to maintain the backward compatibility), and/or both.

Figure 9:
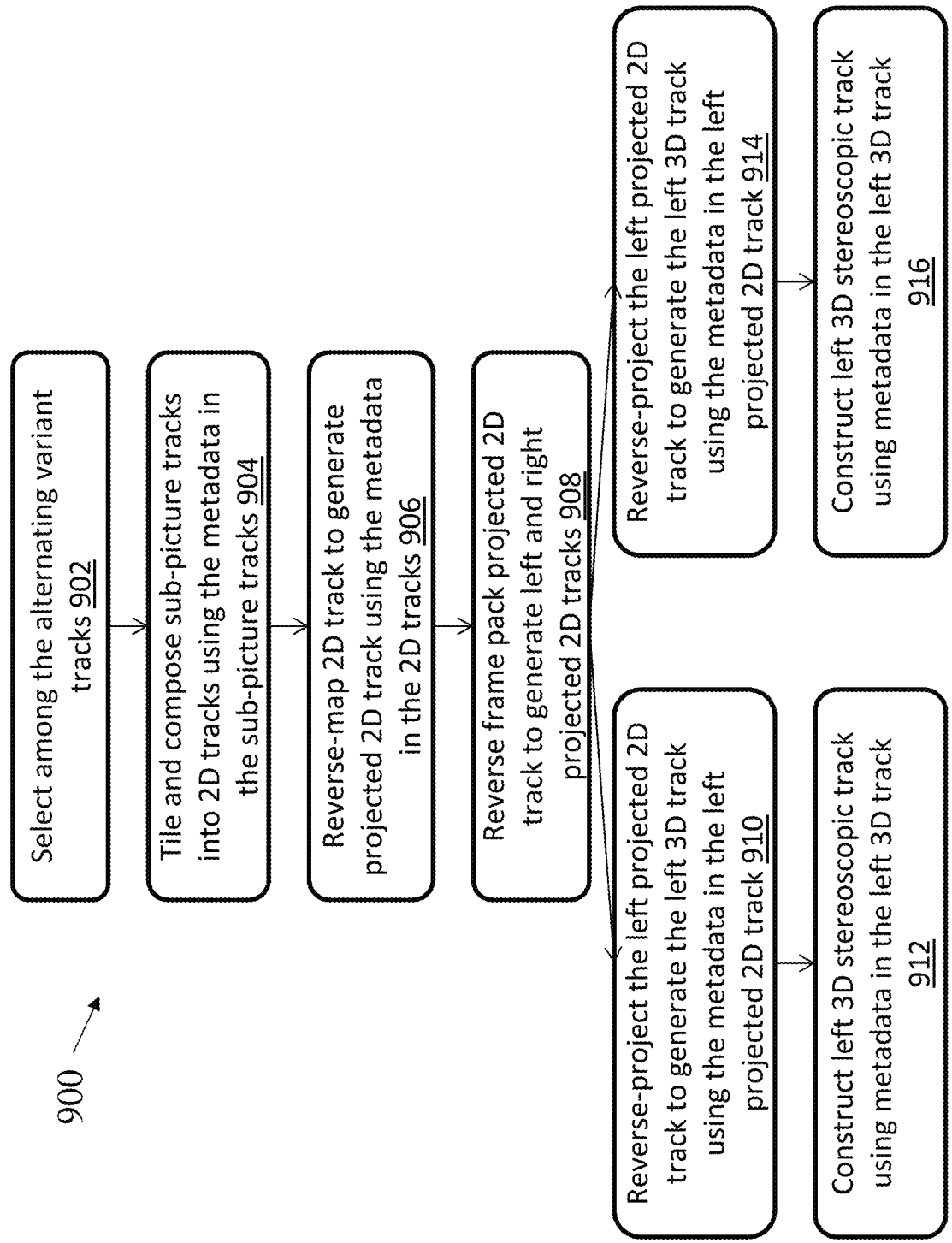
FIG. 9 shows an exemplary decoding method for decoding video data, according to some embodiments.

FIG. 9 shows an exemplary decoding process 900, according to some embodiments. As discussed herein, the variant tracks include the actual picture data. Referring to FIGS. 8A-8B, at step 902, the decoding device (e.g., decoding device 110) initially selects among the alternating variant tracks 820, 822 to pick the one that is representative of the sub-picture region (or sub-picture track) 818. At step 904, the decoding device tiles and composes together the sub-picture tracks 818 into the 2D big picture track 816. The decoder can use the metadata in the sub-picture track 818, such as the 2dcc box. The decoder can use the metadata carried in the sub-picture track to determine two-dimensional spatial relationship data, such as data indicative of a position in a coordinate system, the coordinate system, an orientation of the coordinate system, and/or the like.

At step 906, the decoding reverse-maps the 2D track 816, e.g., to rearrange some of the portions, to generate the projected 2D track 814. The decoder can use the metadata in the 2D track 816, such as the rwpk box. The decoder can use the metadata to determine region-wise packing metadata, such as data regarding a relationship between packed regions in the packed two-dimensional track and projected regions in the projected two-dimensional track.

At step 908, the decoder reverse-frame packs the projected 2D track 814 to generate the left and right projected 2D tracks 812 and 810. The decoder uses the metadata in the projected 2D track 814 to determine frame packing metadata, such as data regarding the packing of the left and right 2D tracks (e.g., top-and-bottom, side-by-side, etc.). In some embodiments, the decoder can use information provided in the StereoVideoBox to un-do the frame packing to derive the projected left and right tracks (e.g., according to the first byte of stereo_indication_type, which can indicate how the two projected left and right picture tracks are frame-packed, as discussed herein).

At step 910 the decoder reverse-projects the left 2D projected track 810 back to the 3D track 802, which is the original left 3D picture. The decoder can use metadata in the left 2D projected track 810 (e.g., a proj box). At step 912, the decoder constructs a 3D stereoscopic track using the metadata in the 3D track 802 (e.g., the ster box). The decoder can determine stereoscopic video track grouping metadata, which can include data indicative of whether the spherical content track is for a left or right view of a stereoscopic view. At steps 914 and 916 for the right view, like steps 910 and 912 for the left view, the decoder reverse-projects the right 2D projected track 812 back to the 3D track 804, and constructs a 3D stereoscopic track using the metadata in the 3D track 804.

As shown in FIG. 9, metadata is inherited as the decoding process progresses through the track hierarchy, including for reverse-frame packing derivation operations. For example, as shown and discussed in conjunction with FIGS. 8A-9, the metadata boxes included at each track level are inherited through the inclusion in associated derived tracks in the hierarchy. The inherited metadata can be specified in a much more efficient manner using such inheritance, such that a metadata savings can be appreciated, decoding processing can be made more efficient (e.g., since the metadata is specified at the necessary derived track), and/or the like. For example, the hierarchy can be used to determine metadata and/or attributes from the top-down, whereas with a flat file system the metadata and/or attributes could not be determined on a level-by-level basis.

As an illustrative example, metadata (e.g., metadata such as proI and pror) can be included in the track hierarchy at a level above frame-packing in the hierarchy. The metadata can be used to recover directional tracks (e.g., left and right frames) from a frame-packed track. Otherwise, if the metadata is not included in the hierarchy, then metadata would be missing that is otherwise needed to decode frame-packed content for producing multi-view content (e.g., stereoscopic views). The metadata can therefore be used to undo the frame-packing according to how the frame-packing was performed (e.g., as shown in FIG. 6B).

Figure 10:
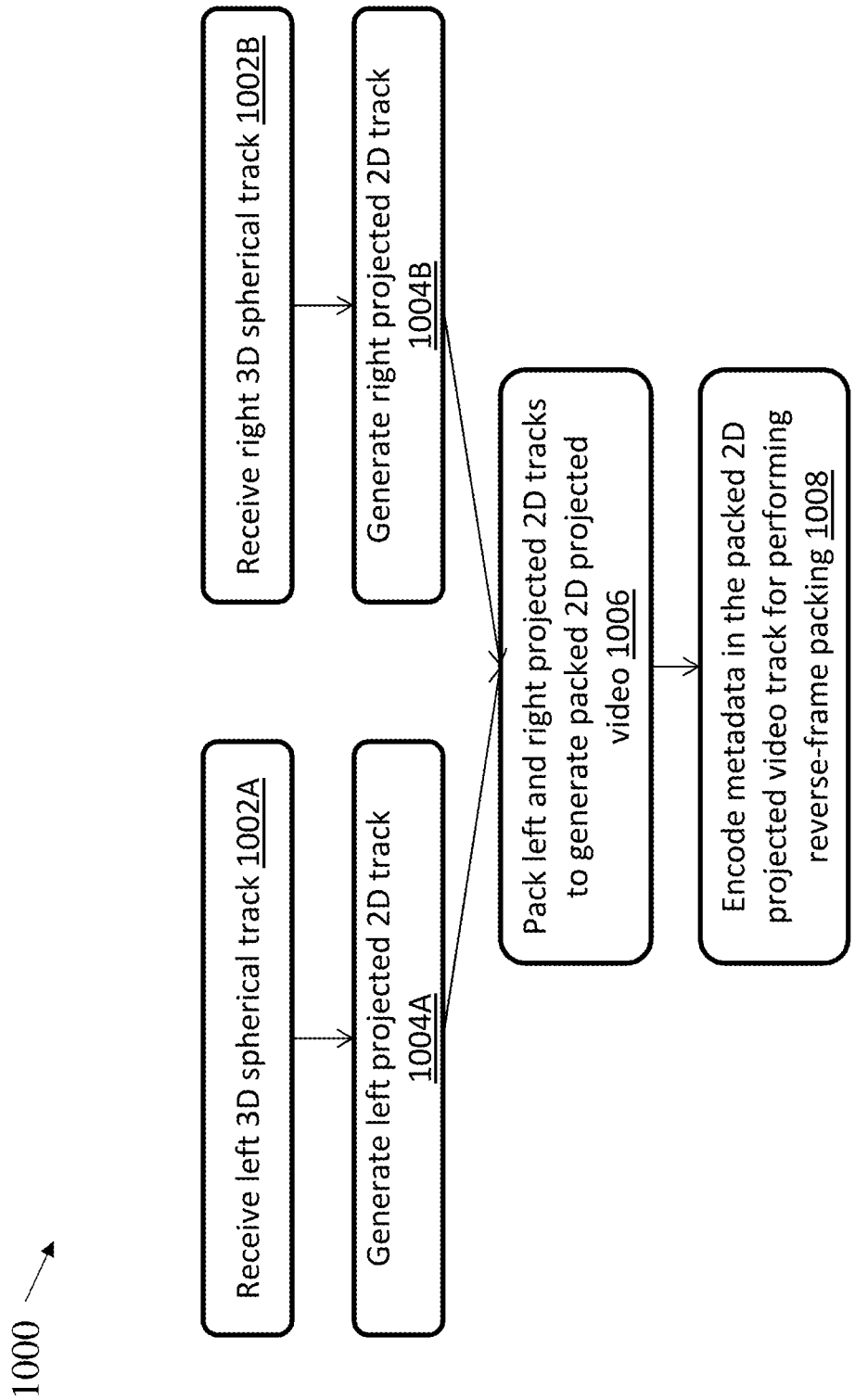
FIG. 10 shows an exemplary encoding method for encoding video data, according to some embodiments.

FIG. 10 shows an exemplary encoding method 1000 for encoding multi-directional video data, according to some embodiments. At steps 1002A and 1002B, the encoding device (e.g., encoding device 104) receives left and right 3D spherical tracks. At steps 1004A and 1004B, the encoding device encodes left and right projected 2D tracks, respectively, each track being at an associated level in the hierarchical track structure. For example, referring to FIG. 8A, the left 3D and projected 2D tracks are each at the levels shown by tracks 802 and 810, such that the left 2D projected track 810, is at a second level in the hierarchical track structure below the first level of the left 3D track 802. At step 1006, the encoding device performs a frame-packing operation to create a frame packed projected 2D track. The frame packed projected 2D track is at a third level in the hierarchy below the left/right 3D tracks and the left/right projected 2D tracks. For example, referring to FIG. 10, the projected 2D track 814 is below both the left/right 3D video tracks 802/804 and the L/R projected 2D video tracks 810/812.

At step 1008, the encoding device encodes metadata in the frame packed 2D projected track for a decoder to use when performing reverse-frame packing operations. In some embodiments, the decoding process can generate additional metadata for a derived track. For example, as explained herein, the metadata can specify information for derived tracks and/or used for derivation operations to generate the various views of the multi-view media. In some embodiments, the metadata can include the 'stvi' metadata box. In some embodiments, the metadata can include 'prol' and 'pror', which can be used to specify how to undo the frame-packing, according to how the frame-packing was performed.

As described herein, the encoding device can encode other metadata in the tracks of the hierarchy. For example, the metadata can be generated when performing a derivation operation for the track based on metadata and/or video content of a derived track that is lower in the hierarchy. In some embodiments, the metadata can include an entry comprising a flag or bit value. For example, the entry can indicate the media data of the derived track was generated (e.g., compared to the absence of the media data prior to the derivation). In some embodiments, the metadata can indicate time and/or date information. For example, the metadata can indicate the time and/or date when the media data derivation is accomplished. In some embodiments, the metadata can include other information regarding a derivation operation. For example, as described herein, the metadata can include "alte" metadata, such as coding information from the chosen alternate track (e.g., metadata related to the image resolution, frame rate, etc. of the chosen alternate track). As another example, the metadata can include "2dcc" metadata, such as coding information from the sub-picture tracks (e.g., metadata related to a range of the image resolutions, frame rates, etc. from the sub-picture tracks). In some embodiments, the metadata can include "rwpk" metadata, such as coding information from the region-wise packed track (e.g., metadata related to the image resolution, frame rate, etc. from the region-wise packed track). The region-wise packed track can be, in some embodiments, the sub-picture composition track from a "2dcc" derivation. In some embodiments, the metadata can include "povd" metadata, such as coding information from the projected track (e.g., metadata related to the image resolution, frame rate, etc. of the projected track). In some embodiments, the metadata can include "ster" metadata, such as coding information from two (e.g., left and right) sphere tracks (e.g., metadata related to a range of the image resolutions, frame rates, etc. from the two sphere tracks). These and other examples of such metadata, which is suitable to be generated when performing a derivation operation for the track based on metadata and/or video content of a derived track that is lower in the hierarchy, are described in ISO/IEC 14496-12. ISOBMFF describes various metadata boxes and attributes for metadata (e.g., generic metadata) for any (e.g., regular as well as derived) samples of video tracks. See, e.g., ISOBMFF, Table 1.

FIG. 11 is a table 1100 showing metadata usage when the metadata is included in derived tracks compared to techniques that include the metadata in the variant tracks, according to some embodiments. Column 1102 shows an example of metadata, such as the ProjectedOmniVideoBox (proj box), and so on, as discussed herein. Column 1104 shows the number of each metadata box in column 1102 for its associated level in the hierarchy, when the metadata is included in the derived tracks as described herein. Column 1104 shows the number of each metadata box in column 1102 for its associated level when the metadata is included in the variant tracks. As a generalization, M×N represents the dimensions of the grid of sub-pictures for each picture. L represents the number of different variant tracks. As shown in column 1104, only one of the ProjectedOmniVideoBox and RegionWisePackingBox are needed when specifying the metadata in the track hierarchy, compared to L×M×N for each when using a flat structure. Similarly, for the SubPictureCompositionBox, only M×N are needed when specifying the metadata in the track hierarchy, compared to L×M×N when using a flat structure.

Techniques operating according to the principles described herein may be implemented in any suitable manner. The processing and decision blocks of the flow charts above represent steps and acts that may be included in algorithms that carry out these various processes. Algorithms derived from these processes may be implemented as software integrated with and directing the operation of one or more single- or multi-purpose processors, may be implemented as functionally-equivalent circuits such as a Digital Signal Processing (DSP) circuit or an Application-Specific Integrated Circuit (ASIC), or may be implemented in any other suitable manner. It should be appreciated that the flow charts included herein do not depict the syntax or operation of any particular circuit or of any particular programming language or type of programming language. Rather, the flow charts illustrate the functional information one skilled in the art may use to fabricate circuits or to implement computer software algorithms to perform the processing of a particular apparatus carrying out the types of techniques described herein. It should also be appreciated that, unless otherwise indicated herein, the particular sequence of steps and/or acts described in each flow chart is merely illustrative of the algorithms that may be implemented and can be varied in implementations and embodiments of the principles described herein.

Accordingly, in some embodiments, the techniques described herein may be embodied in computer-executable instructions implemented as software, including as application software, system software, firmware, middleware, embedded code, or any other suitable type of computer code. Such computer-executable instructions may be written using any of a number of suitable programming languages and/or programming or scripting tools, and also may be compiled as executable machine language code or intermediate code that is executed on a framework or virtual machine.

When techniques described herein are embodied as computer-executable instructions, these computer-executable instructions may be implemented in any suitable manner, including as a number of functional facilities, each providing one or more operations to complete execution of algorithms operating according to these techniques. A "functional facility," however instantiated, is a structural component of a computer system that, when integrated with and executed by one or more computers, causes the one or more computers to perform a specific operational role. A functional facility may be a portion of or an entire software element. For example, a functional facility may be implemented as a function of a process, or as a discrete process, or as any other suitable unit of processing. If techniques described herein are implemented as multiple functional facilities, each functional facility may be implemented in its own way; all need not be implemented the same way. Additionally, these functional facilities may be executed in parallel and/or serially, as appropriate, and may pass information between one another using a shared memory on the computer(s) on which they are executing, using a message passing protocol, or in any other suitable way.

Generally, functional facilities include routines, programs, objects, components, data structures, etc. that perform particular tasks or implement particular abstract data types. Typically, the functionality of the functional facilities may be combined or distributed as desired in the systems in which they operate. In some implementations, one or more functional facilities carrying out techniques herein may together form a complete software package. These functional facilities may, in alternative embodiments, be adapted to interact with other, unrelated functional facilities and/or processes, to implement a software program application.

Some exemplary functional facilities have been described herein for carrying out one or more tasks. It should be appreciated, though, that the functional facilities and division of tasks described is merely illustrative of the type of functional facilities that may implement the exemplary techniques described herein, and that embodiments are not limited to being implemented in any specific number, division, or type of functional facilities. In some implementations, all functionality may be implemented in a single functional facility. It should also be appreciated that, in some implementations, some of the functional facilities described herein may be implemented together with or separately from others (i.e., as a single unit or separate units), or some of these functional facilities may not be implemented.

Computer-executable instructions implementing the techniques described herein (when implemented as one or more functional facilities or in any other manner) may, in some embodiments, be encoded on one or more computer-readable media to provide functionality to the media. Computer-readable media include magnetic media such as a hard disk drive, optical media such as a Compact Disk (CD) or a Digital Versatile Disk (DVD), a persistent or non-persistent solid-state memory (e.g., Flash memory, Magnetic RAM, etc.), or any other suitable storage media. Such a computer-readable medium may be implemented in any suitable manner. As used herein, "computer-readable media" (also called "computer-readable storage media") refers to tangible storage media. Tangible storage media are non-transitory and have at least one physical, structural component. In a "computer-readable medium," as used herein, at least one physical, structural component has at least one physical property that may be altered in some way during a process of creating the medium with embedded information, a process of recording information thereon, or any other process of encoding the medium with information. For example, a magnetization state of a portion of a physical structure of a computer-readable medium may be altered during a recording process.

Further, some techniques described above comprise acts of storing information (e.g., data and/or instructions) in certain ways for use by these techniques. In some implementations of these techniques—such as implementations where the techniques are implemented as computer-executable instructions—the information may be encoded on a computer-readable storage media. Where specific structures are described herein as advantageous formats in which to store this information, these structures may be used to impart a physical organization of the information when encoded on the storage medium. These advantageous structures may then provide functionality to the storage medium by affecting operations of one or more processors interacting with the information; for example, by increasing the efficiency of computer operations performed by the processor(s).

In some, but not all, implementations in which the techniques may be embodied as computer-executable instructions, these instructions may be executed on one or more suitable computing device(s) operating in any suitable computer system, or one or more computing devices (or one or more processors of one or more computing devices) may be programmed to execute the computer-executable instructions. A computing device or processor may be programmed to execute instructions when the instructions are stored in a manner accessible to the computing device or processor, such as in a data store (e.g., an on-chip cache or instruction register, a computer-readable storage medium accessible via a bus, a computer-readable storage medium accessible via one or more networks and accessible by the device/processor, etc.). Functional facilities comprising these computer-executable instructions may be integrated with and direct the operation of a single multi-purpose programmable digital computing device, a coordinated system of two or more multi-purpose computing device sharing processing power and jointly carrying out the techniques described herein, a single computing device or coordinated system of computing device (co-located or geographically distributed) dedicated to executing the techniques described herein, one or more Field-Programmable Gate Arrays (FPGAs) for carrying out the techniques described herein, or any other suitable system.

A computing device may comprise at least one processor, a network adapter, and computer-readable storage media. A computing device may be, for example, a desktop or laptop personal computer, a personal digital assistant (PDA), a smart mobile phone, a server, or any other suitable computing device. A network adapter may be any suitable hardware and/or software to enable the computing device to communicate wired and/or wirelessly with any other suitable computing device over any suitable computing network. The computing network may include wireless access points, switches, routers, gateways, and/or other networking equipment as well as any suitable wired and/or wireless communication medium or media for exchanging data between two or more computers, including the Internet. Computer-readable media may be adapted to store data to be processed and/or instructions to be executed by processor. The processor enables processing of data and execution of instructions. The data and instructions may be stored on the computer-readable storage media.

A computing device may additionally have one or more components and peripherals, including input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Embodiments have been described where the techniques are implemented in circuitry and/or computer-executable instructions. It should be appreciated that some embodiments may be in the form of a method, of which at least one example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various aspects of the embodiments described above may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," "having," "containing," "involving," and variations thereof herein, is meant to encompass the items listed thereafter and equivalents thereof as well as additional items.

The word "exemplary" is used herein to mean serving as an example, instance, or illustration. Any embodiment, implementation, process, feature, etc. described herein as exemplary should therefore be understood to be an illustrative example and should not be understood to be a preferred or advantageous example unless otherwise indicated.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the principles described herein. Accordingly, the foregoing description and drawings are by way of example only.

What is claimed is:

1. A decoding method for decoding video data, the method comprising:
    receiving encoded stereoscopic multimedia data comprising a hierarchical track structure comprising at least a first track, wherein the first track:
        is at a first level in the hierarchical track structure; and
        comprises frame packed and projected 2D video data for both a left view and a right view of the stereoscopic multimedia data; and
    decoding the encoded stereoscopic multimedia data, comprising:
        determining metadata contained within the first track, the metadata comprising stereoscopic frame packing metadata, wherein the stereoscopic frame packing metadata comprises data indicative of one or more parameters used to generate first projected 2D video data, second projected 2D video data, or both; and
        performing, based on the determined metadata, an extraction operation on the first track comprising performing at least a reverse-frame packing operation to generate:
            the first projected 2D video data of a second track, wherein the first projected 2D video data is for the left view; and
            the second projected 2D video data of a third track, wherein the second projected 2D video data is for the right view,
            wherein the second track and the third track are at a second level in the hierarchical track structure above the first level of the first track.

2. The decoding method of claim 1, wherein:
    the first track comprises a projected two-dimensional track;
    the second track comprises a first projected video track for the left view; and
    the third track comprises a second projected video track for the right view.

3. The decoding method of claim 1, further comprising performing a track derivation operation on multimedia content associated with the first track to generate media data of the first track.

4. The decoding method of claim 3, wherein:
the first track is associated with a plurality of variant tracks, each variant track including stereoscopic multimedia data; and
performing the track derivation operation comprises performing the track derivation operation on the plurality of variant tracks to generate the media data of the first track.

5. A method for encoding video data, the method comprising:
encoding stereoscopic multimedia data comprising a hierarchical track structure comprising at least a first track, wherein the first track:
is at a first level in the hierarchical track structure; and
comprises frame packed and projected 2D video data for both a left view and a right view of the stereoscopic multimedia data; and
encoding metadata within the first track, the metadata comprising stereoscopic frame packing metadata, wherein the stereoscopic frame packing metadata comprises data indicative of one or more parameters used to generate first projected 2D video data, second projected 2D video data, or both, such that the metadata can be used to determine an extraction operation on the first track comprising performing at least a reverse-frame packing operation to generate:
the first projected 2D video data of a second track, wherein the first projected 2D video data is for the left view; and
the second projected 2D video data of a third track, wherein the second projected 2D video data is for the right view,
wherein the second track and the third track are at a second level in the hierarchical track structure above the first level of the first track,
wherein the encoded video data comprises the encoded stereoscopic multimedia data and the encoded metadata.

6. The encoding method of claim 5, wherein:
the first track comprises a projected two-dimensional track;
the second track comprises a first projected video track for the left view; and
the third track comprises a second projected video track for the right view.

7. An apparatus configured to decode video data, the apparatus comprising a processor in communication with memory, the processor being configured to execute instructions stored in the memory that cause the processor to:
receive encoded stereoscopic multimedia data comprising a hierarchical track structure comprising at least a first track, wherein the first track:
is at a first level in the hierarchical track structure; and
comprises frame packed and projected 2D video data for both a left view and a right view of the stereoscopic multimedia data;
decode the encoded stereoscopic multimedia data, comprising:
determining metadata contained within the first track, the metadata comprising stereoscopic frame packing metadata, wherein the stereoscopic frame packing metadata comprises data indicative of one or more parameters used to generate first projected 2D video data, second projected 2D video data, or both; and
performing, based on the determined metadata, an extraction operation on the first track comprising performing at least a reverse-frame packing operation to generate:
the first projected 2D video data of a second track, wherein the first projected 2D video data is for the left view; and
the second projected 2D video data of a third track, wherein the second projected 2D video data is for the right view,
wherein the second track and the third track are at a second level in the hierarchical track structure above the first level of the first track.

8. The apparatus of claim 7, wherein:
the first track comprises a projected two-dimensional track;
the second track comprises a first projected video track for the left view; and
the third track comprises a second projected video track for the right view.

9. The apparatus of claim 7, wherein the instructions are further configured to cause the processor to perform a track derivation operation on multimedia content associated with the first track to generate media data of the first track.

10. The apparatus of claim 9, wherein:
the first track is associated with a plurality of variant tracks, each variant track including stereoscopic multimedia data; and
performing the track derivation operation comprises performing the track derivation operation on the plurality of variant tracks to generate the media data of the first track.

11. An apparatus for encoding video data, the apparatus comprising a processor in communication with memory, the processor being configured to execute instructions stored in the memory that cause the processor to:
encode stereoscopic multimedia data comprising a hierarchical track structure comprising at least a first track, wherein the first track:
is at a first level in the hierarchical track structure; and
comprises frame packed and projected 2D video data for both a left view and a right view of the stereoscopic multimedia data; and
encode metadata within the first track, the metadata comprising stereoscopic frame packing metadata, wherein the stereoscopic frame packing metadata comprises data indicative of one or more parameters used to generate first projected 2D video data, second projected 2D video data, or both, such that the metadata can be used to determine an extraction operation on the first track comprising performing at least a reverse-frame packing operation to generate:
the first projected 2D video data of a second track, wherein the first projected 2D video data is for the left view; and
the second projected 2D video data of a third track, wherein the second projected 2D video data is for the right view,
wherein the second track and the third track are at a second level in the hierarchical track structure above the first level of the first track,
wherein the encoded video data comprises the encoded stereoscopic multimedia data and the encoded metadata.

12. The apparatus of claim 11, wherein:
the first track comprises a projected two-dimensional track;

the second track comprises a first projected video track for the left view; and the third track comprises a second projected video track for the right view.

* * * * *